(12) United States Patent
Bai et al.

(10) Patent No.: US 11,330,620 B2
(45) Date of Patent: May 10, 2022

(54) BEAM DETERMINATION FOR A SLOT AGGREGATION

(71) Applicant: QUALCOMM Incorporated, San Diego, CA (US)

(72) Inventors: Tianyang Bai, Bridgewater, NJ (US); Makesh Pravin John Wilson, San Diego, CA (US); Jung Ho Ryu, Fort Lee, NJ (US); Kiran Venugopal, Raritan, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/413,103

(22) Filed: May 15, 2019

(65) Prior Publication Data

US 2020/0053767 A1  Feb. 13, 2020

Related U.S. Application Data

(60) Provisional application No. 62/717,481, filed on Aug. 10, 2018.

(51) Int. Cl.
*H04W 72/04* (2009.01)
*H04W 72/14* (2009.01)
*H04W 72/02* (2009.01)

(52) U.S. Cl.
CPC ........... *H04W 72/14* (2013.01); *H04W 72/02* (2013.01); *H04W 72/044* (2013.01); *H04W 72/048* (2013.01)

(58) Field of Classification Search
CPC ... H04W 72/14; H04W 72/02; H04W 72/048; H04W 72/044; H04W 72/046; H04W 72/1289; H04B 7/088; H04B 7/0695
See application file for complete search history.

(56) References Cited

U.S. PATENT DOCUMENTS 11,219,018 B2 *   1/2022   Baldemair .......... H04W 72/042
2018/0167932 A1 * 6/2018   Papasakellariou .... H04L 5/0055
(Continued)

FOREIGN PATENT DOCUMENTS

GB   2576205 A   *  2/2020  ........... H04L 1/1887
WO   WO2020026424   *  8/2018
WO   WO-2019099659 A1 *  5/2019  ........... H04L 5/0094

OTHER PUBLICATIONS

International Search Report and Written Opinion—PCT/US2019/045981—ISA/EPO—dated Oct. 31, 2019 (184642WO).
(Continued)

*Primary Examiner* — Un C Cho
*Assistant Examiner* — Lalita W Pace
(74) *Attorney, Agent, or Firm* — Holland & Hart LLP; Nerrie M. Zohn

(57) ABSTRACT

Methods, systems, and devices for wireless communications are described. A user equipment (UE) may transmit to a base station an indication of a UE capability associated with a beam change at the UE. The UE may receive, from the base station during a scheduling slot, a control signal including a transmission configuration indicator (TCI) and a grant for a transport block over a first slot aggregation including a set of slots. In some cases, each slot of the first slot aggregation is offset from the scheduling slot according to a scheduling constraint based on the indicated UE capability. The UE may transmit or receive the transport block over the first slot aggregation using a UE beam based on the TCI.

19 Claims, 19 Drawing Sheets

(56) References Cited

U.S. PATENT DOCUMENTS

| | | | |
|---|---|---|---|
| 2018/0317207 A1* | 11/2018 | Liao | H04L 5/0094 |
| 2019/0075589 A1* | 3/2019 | Jeon | H04W 72/1278 |
| 2019/0141693 A1* | 5/2019 | Guo | H04W 72/042 |
| 2019/0149269 A1* | 5/2019 | Chatterjee | H04W 72/1268 370/329 |
| 2019/0239093 A1* | 8/2019 | Zhang | H04L 5/001 |
| 2019/0281587 A1* | 9/2019 | Zhang | H04L 5/0053 |
| 2019/0306850 A1* | 10/2019 | Zhang | H04B 7/0639 |
| 2020/0022175 A1* | 1/2020 | Xiong | H04W 72/042 |
| 2020/0077395 A1* | 3/2020 | Guo | H04W 72/042 |
| 2020/0235891 A1* | 7/2020 | Lei | H04L 1/1822 |
| 2021/0037523 A1* | 2/2021 | Li | H04W 72/0453 |
| 2021/0143957 A1* | 5/2021 | Gao | H04L 5/0048 |
| 2021/0185702 A1* | 6/2021 | Kim | H04L 5/00 |

OTHER PUBLICATIONS

Samsung: "Remaining Details on PDSCH Beam Indication", 3GPP Draft; R1-1720302, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017, XP051368951,4 pages, Retrieved from the Internet: URL: http://www.3gpp.org/ftp/tsg%5Fran/WG1%5FRL1/TSGR1%5F91/Docs/ [retrieved on Nov. 17, 2017] p. 1-p. 4.

Samsung: "On Beam Management, Measurement and Reporting", 3GPP Draft; R1-1720290_V1, 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Nov. 17, 2017 (Nov. 17, 2017), XP051368939, 15 Pages, Retrieved from the Internet: URL: http://www.3gpp.org/ftp/tsg_ran/WG1_RL1/TSGR1_91/Docs/ [retrieved on Nov. 17, 2017].

Samsung: "Slot Aggregation", 3GPP Draft; R1-1705400 NR Slot Aggregation, 3rd Generation Partnership Project (3GPP), Mobile Competence Centre ;650, Route Des Lucioles ; F-06921 Sophia-Antipolis Cedex ; France, vol. RAN WG1, No. Spokane, USA; Apr. 3, 2017-Apr. 7, 2017, Mar. 24, 2017 (Mar. 24, 2017), XP051250685, 2 Pages, Retrieved from the Internet: URL:http://www.3gpp.org/ftp/tsg_ran/WG1_RL1/TSGR1_88b/Docs/ [retrieved on Mar. 24, 2017], p. 2, section 2, Option 2.

Vivo: "Design of Group-common PDCCH", 3GPP Draft; R1-1715631_GC PDCCH, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339097, 9 Pages, Retrieved from the Internet: URL: http://www.3gpp.org/ftp/Meetings_3GPP_SYNC/RAN1/Docs/ [retrieved on Sep. 17, 2017] p. 6.

* cited by examiner

DCI 405

Aggregated Slots 1
425-a

Aggregated Slots 2
425-b

Aggregated Slots 3
425-c

DCI 505

Aggregated Slots 1
525-a

Aggregated Slots 2
525-b

Aggregated Slots 3
525-c

500

BEAM DETERMINATION FOR A SLOT AGGREGATION

CROSS REFERENCE

The present application for patent claims the benefit of U.S. Provisional Patent Application No. 62/717,481 by BAI, et al., entitled "BEAM DETERMINATION FOR A SLOT AGGREGATION," filed Aug. 10, 2018, assigned to the assignee hereof, and expressly incorporated herein.

BACKGROUND

The following relates generally to wireless communications, and more specifically to beam determination for a slot aggregation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE and a base station may support beamformed communications. The base station may schedule the UE for a transmission, and the UE and the base station may select beams to use for the transmission. In some cases, the UE and base station may coordinate beam selection according to a set of rules. However, if the UE or the base station selects non-corresponding beams, switches beams, or selects inefficient beams, decoding performance at the receiving device may be impaired.

SUMMARY

A user equipment (UE) and a base station may implement rules for selecting a beam in a wireless communications system which support slots aggregation. The UE may transmit a threshold value to the base station corresponding to a beam switching capability of the UE. For example, the threshold value may correspond to a number of slots it takes for the UE to switch to a new beam. The base station may transmit control signaling to the UE which schedules one or more slots and includes a transmit configuration indicator (TCI) corresponding to the scheduled slots. The UE may identify a UE beam which corresponds to the TCI indicated in the control signaling. The UE and base station may also identify an offset (e.g., a number of slots) between the scheduling slot and the scheduled slots. The UE and base station may implement techniques to select beams based on the TCI included in the control signaling, the UE capability, and the offset between the scheduling slot and the scheduled slots.

For example, if the offset between the scheduling slot and the scheduled slots is greater than the threshold value (e.g., UE capability), then the UE may use a UE beam corresponding to the TCI included in the control signaling. For example, the UE may use a UE beam which is quasi co-located with a beam corresponding to the TCI of the control signaling. In some cases, the base station may schedule the UE such that each slot of the scheduled slots is offset from the scheduling slot based on the UE capability. In some other examples, the UE and base station may select beams based on identifying scheduling conflicts for scheduled slots. In some cases, the UE and base station may select beams based on whether or not the offset between the scheduling slot is greater than the threshold value corresponding to the UE capability. As such, the UE and base station may implement techniques which may improve decoding at the receiving device. For example, the UE and base station may select beams which provide a better signal-to-noise ratio (SNR) or select beams to reduce a number of beam switches made during a slot aggregation.

A method of wireless communications at a UE is described. The method may include transmitting to a base station an indication of a UE capability associated with a beam change at the UE, receiving from the base station during a scheduling slot a control signal including a TCI and a grant for a transport block over a first slot aggregation including a set of slots, and transmitting or receiving at least one instance of the transport block over at least one slot of the first slot aggregation using a UE beam, where the UE beam is selected based on the UE capability, an offset between the scheduling slot and a sequentially first slot of the at least one slot, and the TCI.

An apparatus for wireless communications at a UE is described. The apparatus may include a processor, memory in electronic communication with the processor, and instructions stored in the memory. The instructions may be executable by the processor to cause the apparatus to transmit to a base station an indication of a UE capability associated with a beam change at the UE, receive from the base station during a scheduling slot a control signal including a TCI and a grant for a transport block over a first slot aggregation including a set of slots, and transmit or receiving at least one instance of the transport block over at least one slot of the first slot aggregation using a UE beam, where the UE beam is selected based on the UE capability, an offset between the scheduling slot and a sequentially first slot of the at least one slot, and the TCI.

Another apparatus for wireless communications at a UE is described. The apparatus may include means for transmitting to a base station an indication of a UE capability associated with a beam change at the UE, receiving from the base station during a scheduling slot a control signal including a TCI and a grant for a transport block over a first slot aggregation including a set of slots, and transmitting or receiving at least one instance of the transport block over at least one slot of the first slot aggregation using a UE beam, where the UE beam is selected based on the UE capability, an offset between the scheduling slot and a sequentially first slot of the at least one slot, and the TCI.

A non-transitory computer-readable medium storing code for wireless communications at a UE is described. The code may include instructions executable by a processor to transmit to a base station an indication of a UE capability associated with a beam change at the UE, receive from the base station during a scheduling slot a control signal including a TCI and a grant for a transport block over a first slot aggregation including a set of slots, and transmit or receiving at least one instance of the transport block over at least one slot of the first slot aggregation using a UE beam, where the UE beam is selected based on the UE capability, an offset between the scheduling slot and a sequentially first slot of the at least one slot, and the TCI.

Some examples of the method, apparatuses, and non-transitory computer-readable medium described herein may further include operations, features, means, or instructions for selecting the UE beam based on a difference between a minimum time offset threshold and the offset between the scheduling slot and the sequentially first slot of the at least one slot, where the minimum time offset threshold may be based on the indicated UE capability.

In some examples of the method, apparatuses, and non-transitory computer-readable medium described herein, selecting the UE beam may include operations, features, means, or instructions for selecting a receive beam indicated by the TCI if the minimum time offset threshold may be less than the offset between the scheduling slot and the sequentially first slot of the at least one slot.

In some examples of the method, apparatuses, and non-transitory computer-readable medium described herein, selecting the UE beam may include operations, features, means, or instructions for selecting a default beam if the minimum time offset threshold may be greater than the offset between the scheduling slot and the sequentially first slot of the at least one slot.

Some examples of the method, apparatuses, and non-transitory computer-readable medium described herein may further include operations, features, means, or instructions for receiving a semi-static slot configuration, where a portion of the first slot aggregation conflicts with the semi-static slot configuration.

Some examples of the method, apparatuses, and non-transitory computer-readable medium described herein may further include operations, features, means, or instructions for ignoring a portion of the first slot aggregation that conflicts with the semi-static slot configuration.

In some examples of the method, apparatuses, and non-transitory computer-readable medium described herein, the sequentially first slot of the at least one slot may be a first slot of a second portion of the first slot aggregation that does not conflict with the semi-static slot configuration.

In some examples of the method, apparatuses, and non-transitory computer-readable medium described herein, receiving the control signal may include operations, features, means, or instructions for receiving a set of repetitions of the control signal over a second slot aggregation occurring prior to the first slot aggregation.

In some examples of the method, apparatuses, and non-transitory computer-readable medium described herein, the scheduling slot includes a slot carrying a last repetition of the set of repetitions of the control signal.

In some examples of the method, apparatuses, and non-transitory computer-readable medium described herein, the scheduling slot includes a slot carrying a first repetition of the set of repetitions of the control signal.

A method of wireless communications at a UE is described. The method may include transmitting to a base station an indication of a UE capability associated with a beam change at the UE, receiving from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability, and transmitting or receiving the transport block over the first slot aggregation using a UE beam based on the transmission configuration indicator.

An apparatus for wireless communications at a UE is described. The apparatus may include a processor, memory in electronic communication with the processor, and instructions stored in the memory. The instructions may be executable by the processor to cause the apparatus to transmit to a base station an indication of a UE capability associated with a beam change at the UE, receive from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the first slot aggregation using a UE beam based on the transmission configuration indicator.

Another apparatus for wireless communications at a UE is described. The apparatus may include means for transmitting to a base station an indication of a UE capability associated with a beam change at the UE, receiving from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability, and transmitting or receiving the transport block over the first slot aggregation using a UE beam based on the transmission configuration indicator.

A non-transitory computer-readable medium storing code for wireless communications at a UE is described. The code may include instructions executable by a processor to transmit to a base station an indication of a UE capability associated with a beam change at the UE, receive from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the first slot aggregation using a UE beam based on the transmission configuration indicator.

In some examples of the method, apparatuses, and non-transitory computer-readable medium described herein, receiving the control signal may include operations, features, means, or instructions for receiving a set of repetitions of the control signal over a second slot aggregation occurring prior to the first slot aggregation.

In some examples of the method, apparatuses, and non-transitory computer-readable medium described herein, the scheduling slot includes a slot carrying a last repetition of the set of repetitions of the control signal.

In some examples of the method, apparatuses, and non-transitory computer-readable medium described herein, the scheduling slot includes a slot carrying a first repetition of the set of repetitions of the control signal.

In some examples of the method, apparatuses, and non-transitory computer-readable medium described herein, the UE capability indicates a minimum time offset threshold between the scheduling slot and the first slot aggregation, and the first slot aggregation occurs after the minimum time offset threshold from the scheduling slot.

A method of wireless communications at a base station is described. The method may include receiving from a UE an indication of a UE capability associated with a beam change at the UE, transmitting during a scheduling slot a control signal including a TCI and a grant for a transport block over a first slot aggregation including a set of slots, and transmitting or receiving at least one instance of the transport block over at least one slot of the first slot aggregation using a base station beam; where the base station beam is selected based on the UE capability, an offset between the scheduling slot and a sequentially first slot of the at least one slot, and the TCI.

An apparatus for wireless communications at a base station is described. The apparatus may include a processor, memory in electronic communication with the processor, and instructions stored in the memory. The instructions may be executable by the processor to cause the apparatus to receive from a UE an indication of a UE capability associated with a beam change at the UE, transmit during a scheduling slot a control signal including a TCI and a grant for a transport block over a first slot aggregation including a set of slots, and transmit or receiving at least one instance of the transport block over at least one slot of the first slot aggregation using a base station beam; where the base station beam is selected based on the UE capability, an offset between the scheduling slot and a sequentially first slot of the at least one slot, and the TCI.

Another apparatus for wireless communications at a base station is described. The apparatus may include means for receiving from a UE an indication of a UE capability associated with a beam change at the UE, transmitting during a scheduling slot a control signal including a TCI and a grant for a transport block over a first slot aggregation including a set of slots, and transmitting or receiving at least one instance of the transport block over at least one slot of the first slot aggregation using a base station beam; where the base station beam is selected based on the UE capability, an offset between the scheduling slot and a sequentially first slot of the at least one slot, and the TCI.

A non-transitory computer-readable medium storing code for wireless communications at a base station is described. The code may include instructions executable by a processor to receive from a UE an indication of a UE capability associated with a beam change at the UE, transmit during a scheduling slot a control signal including a TCI and a grant for a transport block over a first slot aggregation including a set of slots, and transmit or receiving at least one instance of the transport block over at least one slot of the first slot aggregation using a base station beam; where the base station beam is selected based on the UE capability, an offset between the scheduling slot and a sequentially first slot of the at least one slot, and the TCI.

Some examples of the method, apparatuses, and non-transitory computer-readable medium described herein may further include operations, features, means, or instructions for determining a minimum time offset threshold from the scheduling slot based on the UE capability.

Some examples of the method, apparatuses, and non-transitory computer-readable medium described herein may further include operations, features, means, or instructions for selecting the base station beam based on a difference between the minimum time offset threshold and the offset between the scheduling slot and the sequentially first slot of the at least one slot.

In some examples of the method, apparatuses, and non-transitory computer-readable medium described herein, selecting the base station beam may include operations, features, means, or instructions for selecting a beam indicated by the TCI if the minimum time offset threshold may be less than the offset between the scheduling slot and the sequentially first slot of the at least one slot.

In some examples of the method, apparatuses, and non-transitory computer-readable medium described herein, selecting the base station beam may include operations, features, means, or instructions for selecting a default beam if the minimum time offset threshold may be greater than the offset between the scheduling slot and the sequentially first slot of the at least one slot.

Some examples of the method, apparatuses, and non-transitory computer-readable medium described herein may further include operations, features, means, or instructions for transmitting a semi-static slot configuration to the UE, where a portion of the first slot aggregation conflicts with the semi-static slot configuration.

Some examples of the method, apparatuses, and non-transitory computer-readable medium described herein may further include operations, features, means, or instructions for refraining from transmitting an instance of the transport block during the portion of the first slot aggregation that conflicts with the semi-static slot configuration.

In some examples of the method, apparatuses, and non-transitory computer-readable medium described herein, the sequentially first slot of the at least one slot may be a first slot of a second portion of the first slot aggregation that does not conflict with the semi-static slot configuration.

In some examples of the method, apparatuses, and non-transitory computer-readable medium described herein, transmitting the control signal may include operations, features, means, or instructions for transmitting a set of repetitions of the control signal over a second slot aggregation occurring prior to the first slot aggregation.

In some examples of the method, apparatuses, and non-transitory computer-readable medium described herein, the scheduling slot includes a slot carrying a last repetition of the set of repetitions of the control signal.

In some examples of the method, apparatuses, and non-transitory computer-readable medium described herein, the scheduling slot includes a slot carrying a first repetition of the set of repetitions of the control signal.

A method of wireless communications at a base station is described. The method may include receiving from a UE an indication of a UE capability associated with a beam change at the UE, transmitting, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmitting or receiving the transport block over the slot aggregation using a base station beam based on the TCI.

An apparatus for wireless communications at a base station is described. The apparatus may include a processor, memory in electronic communication with the processor, and instructions stored in the memory. The instructions may be executable by the processor to cause the apparatus to receive from a UE an indication of a UE capability associated with a beam change at the UE, transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the slot aggregation using a base station beam based on the TCI.

Another apparatus for wireless communications at a base station is described. The apparatus may include means for receiving from a UE an indication of a UE capability associated with a beam change at the UE, transmitting, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmitting or receiving the transport block over the slot aggregation using a base station beam based on the TCI.

A non-transitory computer-readable medium storing code for wireless communications at a base station is described. The code may include instructions executable by a processor to receive from a UE an indication of a UE capability associated with a beam change at the UE, transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the slot aggregation using a base station beam based on the TCI.

Some examples of the method, apparatuses, and non-transitory computer-readable medium described herein may further include operations, features, means, or instructions for determining a minimum time offset threshold from the scheduling slot based on the UE capability and selecting the set of slots such that the first slot aggregation occurs after the minimum time offset threshold from the scheduling slot.

In some examples of the method, apparatuses, and non-transitory computer-readable medium described herein, transmitting the control signal may include operations, features, means, or instructions for transmitting a set of repetitions of the control signal over a second slot aggregation occurring prior to the first slot aggregation.

In some examples of the method, apparatuses, and non-transitory computer-readable medium described herein, the scheduling slot includes a slot carrying a last repetition of the set of repetitions of the control signal.

In some examples of the method, apparatuses, and non-transitory computer-readable medium described herein, the scheduling slot includes a slot carrying a first repetition of the set of repetitions of the control signal.

DETAILED DESCRIPTION

Figure 1:
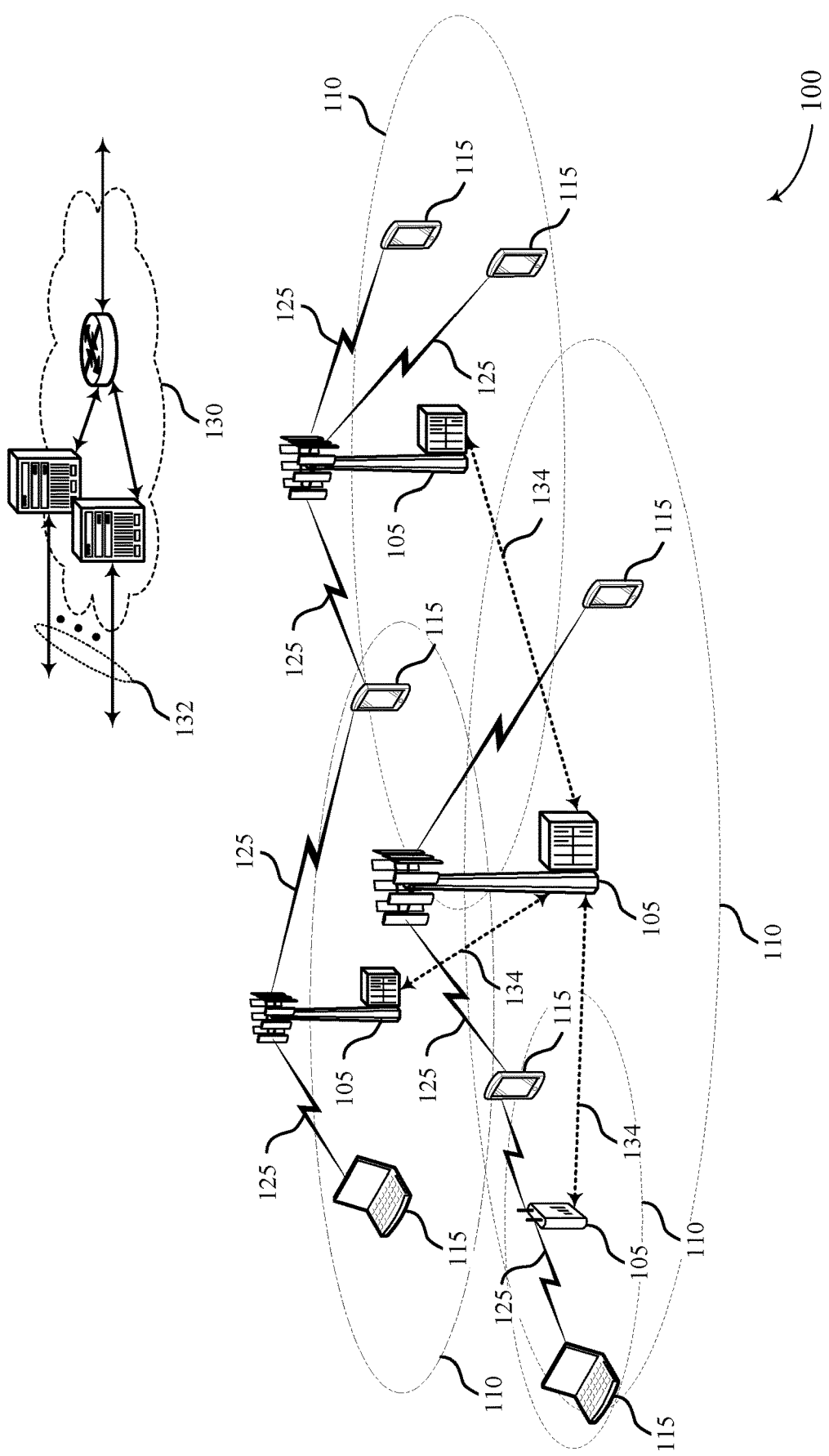
FIG. 1 illustrates an example of a system for wireless communications that supports beam determination for a slot aggregation in accordance with aspects of the present disclosure.

A base station and a user equipment (UE) may communicate using beamformed communications. For example, the base station may transmit in the direction of the UE using a directional transmit beam, and the UE may receive the transmission using a directional receive beam. Each beam may have an associated beam ID, beam direction, beam symbols, and the like. In other examples, the base station and UE may be configured for uplink transmission, where the base station uses a receive beam and the UE uses a transmit beam. Each candidate beam may be associated with a transmit configuration indicator (TCI) state. The TCI state may function as a label for a beam. In some cases, the TCI state of a beam may be associated with spatial parameters of the beam, such as a direction of the beam. In some cases, the UE and base station may support slot aggregation, where a transport block is repeated across multiple slots. The receiver can soft combine across the aggregated to improve decoding performance.

In some cases, two beams may be quasi collocated (QCL) with respect to certain properties, such as spatial receive parameters, Doppler effect, and delay. If two beams are QCL, those two beams may have the same values for QCL associated parameters. Therefore, the base station may indicate use of a base station beam, and the UE may select a UE beam based on a QCL association between the base station beam and the UE beam. For example, the base station may transmit control signaling which schedules a slot and includes an indication of a TCI state for the scheduled slot. The UE may select a corresponding UE beam to use for the scheduled slot based on a QCL association between the indicated TCI state and a TCI state of a candidate UE beam. UE capability may consider beam switching aspects, such as how long it takes (e.g., reported as a number of slots or a number of symbol periods) for the UE to switch to a new beam. The UE may report a threshold value corresponding to the UE beam switch capability to the base station in a radio resource control (RRC) message, for example as part of reporting UE capability.

The UE and base station may implement rules to determine which beams to use. For example, the UE may be scheduled a slot which has a time offset between the scheduling slot and the scheduled slot which is smaller than the threshold value corresponding to the UE capability. In these cases, the UE may use a default beam for slots before the threshold value and switch to a UE beam based on the TCI indicated in the control signaling after a number of slots corresponding to the threshold value. However, this may lead to the different slots having a different signal-to-noise ratio (SNR), which may affect decoding performance.

Various aspects of the present disclosure are described herein which provide that the UE and base station may implement techniques to select beams based on the TCI included in the control signaling, the UE capability, and the offset between the scheduling slot and the scheduled slots. For example, if the offset between the scheduling slot and the scheduled slots is greater than the threshold value (e.g., UE capability), then the UE may use a UE beam corresponding to the TCI included in the control signaling. In some cases, the base station may schedule the UE such that each slot of the scheduled slots is offset from the scheduling slot based on the UE capability. In some other examples, the UE and base station may select beams based on identifying scheduling conflicts for scheduled slots. In some cases, the UE and base station may select beams based on whether or not the offset between the scheduling slot is greater than the threshold value corresponding to the UE capability. As such, the UE and base station may implement techniques which may improve decoding at the receiving device. For example, the UE and base station may select beams which provide better SNR or select beams to reduce a number of beam switches made during a slot aggregation.

Aspects of the disclosure are initially described in the context of a wireless communications system. Aspects of the disclosure are further illustrated by and described with reference to apparatus diagrams, system diagrams, and flowcharts that relate to beam determination for a slot aggregation.

FIG. 1 illustrates an example of a wireless communications system 100 that supports beam determination for a slot aggregation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA)

or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 and a base station 105 may implement rules for selecting a beam in a wireless communications system which support slots aggregation. The UE 115 may transmit a threshold value to the base station 105 corresponding to a beam switching capability of the UE 115. For example, the threshold value may correspond to a number of slots it takes for the UE 115 to switch to a new beam. The base station 105 may transmit control signaling to the UE 115 which schedules one or more slots and includes a TCI corresponding to the scheduled slots. The UE 115 may identify a UE beam which corresponds to the TCI indicated in the control signaling. The UE 115 and base station 105 may also identify an offset (e.g., a number of slots) between the scheduling slot and the scheduled slots. The UE 115 and base station 105 may implement techniques to select beams based on the TCI included in the control signaling, the UE capability, and the offset between the scheduling slot and the scheduled slots.

For example, if the offset between the scheduling slot and the scheduled slots is greater than the threshold value (e.g., UE capability), then the UE 115 may use a UE beam corresponding to the TCI included in the control signaling. For example, the UE 115 may use a UE beam which is quasi co-located with a beam corresponding to the TCI of the control signaling. In some cases, the base station 105 may schedule the UE 115 such that each slot of the scheduled slots is offset from the scheduling slot based on the UE capability. In some other examples, the UE 115 and base station 105 may select beams based on identifying scheduling conflicts for scheduled slots. In some cases, the UE 115 and base station 105 may select beams based on whether or not the offset between the scheduling slot is greater than the threshold value corresponding to the UE capability.

Acronyms such as QCL, DCI, TCI, SNR, PDCCH, PDSCH, PUSCH, and others are used merely for convenience and are not exclusively limited to a specific technology.

Figure 2:
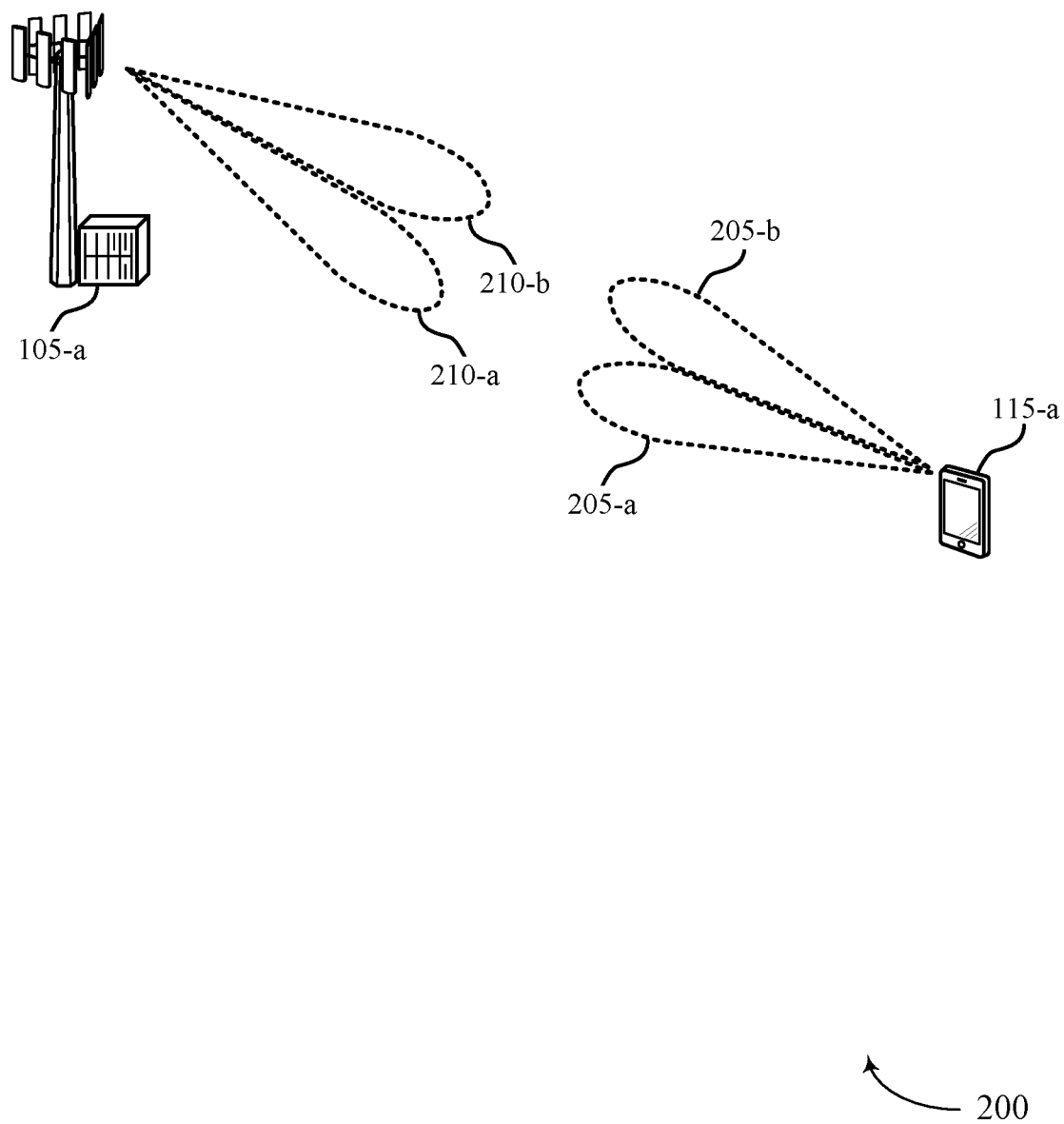
FIG. 2 illustrates an example of a wireless communications system that supports beam determination for a slot aggregation in accordance with aspects of the present disclosure.

FIG. 2 illustrates an example of a wireless communications system 200 that supports beam determination for a slot aggregation in accordance with aspects of the present disclosure. In some examples, wireless communications system 200 may implement aspects of wireless communications system 100. The wireless communications system 200 may include UE 115-*a* and base station 105-*a*, which may be respective examples of a UE 115 and a base station 105 as described herein. Generally, examples described herein are described in the context of downlink operation. However, techniques described herein are applicable for uplink transmission as well.

Base station 105-*a* may transmit to UEs 115 located within the coverage area of base station 105-*a*, including UE 115-*a*. Base station 105-*a* and UE 115-*a* may be configured for beamformed communications, where base station 105-*a* may transmit in the direction of UE 115-*a* using a directional transmit beam (e.g., a transmit beam 210), and UE 115-*a* may receive the transmission using a directional receive beam (e.g., a receive beam 205). Each transmit beam 210 may have an associated beam ID, beam direction, beam symbols, and the like. In some cases, beamforming transmissions may improve a signal-to-noise ratio (SNR). In other examples, base station 105-*a* may be the receiving device, and UE 115-*a* may be the transmitting device, such that base station 105-*a* uses a receive beam and UE 115-*a* uses a transmit beam.

UE 115-*a* may attempt to receive the downlink transmissions via receive beams 205, which may be configured using different beamforming parameters at receive circuitry at UE 115-*a*. UE 115-*a* may identify a particular transmit beam 210, such as transmit beam 210-*a*, and a particular receive beam 205, such as 205-*a*, that provide relatively favorable performance (e.g., that have a best channel quality of the different measured combinations of transmit beams 210 and receive beams 205). In some examples, the UE 115-*a* may transmit an indication of which transmit beam 210 is identified at the UE 115-*a* as a preferred beam, which the base station 105-*a* may select for further transmissions to the UE 115-*a*. UE 115-*a* may thus attain and maintain a beam pair link (BPL) with base station 105-*a*, which may be further refined and maintained in accordance with one or more established beam refinement procedures. Further, in some cases, UE 115-*a* may identify one or more BPLs with one or more other base stations that may be used in the event that the BPL with base station 105-*a* fails (e.g., due to fast fading, blocking, or interference, etc.).

In some examples, each candidate beam may be associated with a TCI state. In some cases, the TCI state may act as a label for a beam. In some cases, the TCI state of a beam may be associated with spatial parameters of the beam, such as a direction of the beam. For example, transmit beam 210-*a* may be pointed in a first direction and have a first TCI state, where transmit beam 210-*b* is pointed in a second direction and has a second, different TCI state. Similarly, each receive beam 205 may have an associated TCI state, which may correspond to the direction of the receive beam 205. The TCI states may also indicate other relationships and parameters in addition to spatial parameters.

In some cases, two beams may be QCL associated with respect to certain properties, such as spatial receive parameters, Doppler shift, Doppler spread, average delay, and delay spread. If two beams are QCL associated for any of these parameters, those two beams may have the same values for the QCL associated parameters. For example, transmit beam 210-a and receive beam 205-a may be QCL associated with respect to a receive spatial filter/beamformer. Therefore, base station 105-a may indicate use of transmit beam 210-a, and UE 115-a may use receive beam 205-a based on the QCL association. For example, base station 105-a may indicate a TCI state used for a scheduled slot, and UE 115-a may select a corresponding receive beam 205 to use for the scheduled slot based on a QCL association of the TCI state.

In some cases, base station 105-a may transmit an indication of the beamforming configuration to UE 115-a. For example, base station 105-a may indicate which control resource sets are configured, identifiers for the configured control resource sets, and TCI states associated with the different control resource sets. UE 115-a may identify TCI states (e.g., beams) which are QCL associated with the TCI states of the control resource sets. The configuration may be indicated via RRC signaling.

In some cases, UE capability may include beam switching aspects, such as the number of slots it takes for the UE 115 to switch between beams. UE 115-a may report a threshold value (e.g., Threshold-sched-offset) to base station 105-a in an RRC message, for example as part of reporting UE capability. The threshold may describe a time to allow UE 115-a to prepare for a new beam. In some cases, preparing a new beam or switching to a different beam may refer to loading a new transmit/receive beam configuration into the radio frequency (RF) circuitry at UE 115-a. In some examples, the threshold for beam switching capability may be referred to as 'X'. The threshold may be measured in slots, or another TTI such as mini-slots or symbol periods.

In some cases, UE 115-a may implement rules to determine which TCI state to use based on the threshold, an indicated TCI state, a time offset between scheduling downlink control information (DCI) and a scheduled slot. An example of this determination rule (e.g., which in some cases may not consider slot aggregation) is described in more detail in FIG. 3. The time offset between the scheduling DCI and a scheduled slot may be referred to as "the offset" herein. In some cases, the offset may be counted in slots, symbols, or mini-slots, or other TTIs. For example, DCI in a first slot may schedule a third slot, such that the time offset is 2 slots, 28 symbols, or a number of mini-slots (e.g., based on whether the mini-slots are 7, 4, or 2 symbols, or another number of symbols). In some cases, the DCI may schedule a slot for downlink communications, and UE 115-a may select a receive beam using techniques described herein. In some other examples, the DCI may schedule a slot for uplink communications, and UE 115-a may select a transmit beam using techniques described herein.

The wireless communications system 200 may also support slot aggregation. For slot aggregation, the transmitting device may transmit the same transport block, which may be repeated in each symbol allocation among each of the aggregated slots. The receiving device may receive the repeated transport blocks and soft combine across the slots, which may improve decoding performance. In some cases, the aggregated slots may use the same modulation and coding scheme (MCS) and have the same resource element allocation. In some examples, the aggregated slots may also have the same transport block size (TBS) and basic graph for a low-density parity-check (LDPC). For example, a first slot and a second slot may be configured for slot aggregation, where the same transport block is transmitted in both slots.

Base station 105-a may transmit higher layer RRC signaling to served UEs 115 (e.g., including UE 115-a) to indicate the slot aggregation. For PDSCH and PUSCH signaling, slot aggregation may be indicated if the aggregation factor parameter is greater than 1 (e.g., aggregationFactorUL>1 for PUSCH or aggregationFactorDL>1 for PDSCH). In some cases, a number of slots in a slot aggregation maybe configured via RRC signaling. In some other examples, the number of slots in the slot aggregation may be signaled in DCI.

In some cases, base station 105-a may transmit control signaling (e.g., DCI) indicating a TCI beam for scheduled, aggregated slots. For example, a base station 105-a may transmit DCI in a second slot indicating a TCI beam for the 5th and 6th slots, where the 6th slot carries the same transport block as the 5th slot. If the UE capability threshold for beam switching is 4 slots, then the first slot of the corresponding aggregated slots (e.g., the 5th slot) may be before the threshold, and the second slot of the aggregated slots (e.g., the 6th slot) may be after the threshold. By a conventional TCI determination rule, UE 115-a would use a different beam for the 5th and 6th slot. Then, slot 4 and 5 would have different SNR values, while the MCS in those slots are kept the same. This may impair decoding performance at UE 115-a.

Instead, when base station 105-a uses DCI to schedule an aggregated slot, the minimum offset to the aggregated slots may be larger than the threshold. Base station 105-a may ensure the minimum offset is larger than the threshold when scheduling UE 115-a. Or, in another example, UE 115-a may use the same beam for all aggregated slots, where the first slot of the aggregation determines the offset and the corresponding TCI beam. For example, UE 115-a may not switch to a different beam for the 5th slot in the above examples. These techniques are described in more detail in FIG. 4.

In some cases, the wireless communications system 200 may support semi-static uplink/downlink assignments. For example, base station 105-a may use RRC signaling to indicate a semi-static slot configuration to UE 115-a in advance. The semi-static slot configuration may indicate which of the upcoming slots are configured for uplink or configured for downlink, or which of the slots are 'flexible' (e.g., can be used for uplink and downlink based on scheduling).

In some cases, a grant in DCI may schedule a conflicting direction for a slot configured by the semi-static configuration. For example, if DCI schedules a slot for downlink transmission when that slot was indicated by the semi-static configuration to be uplink, that slot may not be used for transmission.

In some cases, there may be a conflicting direction for a slot which is aggregated with other slots. For example, a semi-static configuration may indicate a first slot of the aggregation is configured for downlink, but DCI may schedule the first slot for uplink. Therefore, the first slot may not be used for transmission. In some cases, the DCI may also indicate a TCI state for the aggregated slots, and there may be a split in TCI states between the first slot and the second slot of the aggregation (e.g., the first slot is before the threshold and the second slot is after the threshold). In this case, UE 115-*a* may use the TCI beam which is indicated in the DCI. The first slot may not be used for transmission based on the scheduling conflict, so using the indicated TCI state may improve decoding performance for the second slot, which does actually have a transport block. An example of this technique is described in more detail in FIG. 5.

In some cases, base station 105-*a* may transmit DCI in multiple different symbols or slots to increase robustness for a physical downlink control channel (PDCCH). For example, base station 105-*a* may transmit DCI in two different slots to schedule the same slot. To determine the offset, base station 105-*a* may specify which PDCCH symbol is used as a reference. The offset may be counted from the last symbol of the appearance of the scheduling DCI. An example of this is described in more detail in FIG. 6.

As indicated above, various aspects of the present disclosure provide that a base station 105 and a UE 115, such as base station 105-*a* and UE 115-*a*, may implement techniques to coordinate rules for using or updating TCI states at UE 115-*a*. For example, base station 105-*a* and UE 115-*a* may implement techniques which assist UE 115-*a* in identifying a TCI state despite directional conflicts at a slot, or split TCI state determinations in a slot aggregation. In some techniques, base station 105-*a* and UE 115-*a* may implement techniques to avoid these conflicts or split determinations.

Base station 105-*a* may identify the threshold 'X' as a UE capability, for example via an RRC message. Base station 105-*a* may identify a configuration for an aggregated slot/min-slot transmission and send signaling to indicate the configuration to UE 115-*a*. The signaling may at least indicate a time (e.g., a time resource such as one or more slots) and a candidate TCI beam for communicating aggregated slots. In some cases, the indication may be transmitted in DCI (e.g., including a grant for the resources). Base station 105-*a* may determine a TCI beam for transmission based on a time for transmission of at least a portion of the aggregated slots, the time that UE 115-*a* expects to receive the indication, the threshold 'X', the candidate TCI state, a known technique of UE 115-*a* to select a TCI state, or any combination thereof.

The indication may be sent sufficiently ahead of time to send the aggregated slots by at least the threshold 'X', such that the indicated TCI beam is used for transmission of the aggregated slots. In some cases, the portion of the aggregated slots may correspond to the first slot in the aggregated slots, and base station 105-*a* may use the indicated TCI beam if the offset K0 is greater than then threshold 'X'. If the indication was sent in a different occasion or was repeated in time, base station 105-*a* may use a predefined portion to determine the receiving time (e.g., the predefined portion may be the last symbol of the last appearance of the indication). Base station 105-*a* may then transmit or receive the aggregated slot or mini-slot transmission based on the determined beam and configuration. In some cases, base station 105-*a* may send a second indication of a semi-static slot configuration.

Base station 105-*a* may identify any conflicts between the first and second indications of the slot configurations (e.g., conflicts between the semi-static configuration in the second indication and the dynamic scheduling in the first indication). Based on any identified conflicts, base station 105-*a* may either not send or not expect to receive for slots (or mini-slots or symbol periods) that contain conflicts. Base station 105-*a* may use the portion of the non-conflicting portion of the aggregated slots to determine which TCI beam to use. The TCI state may be determined based on the first slot in time that does not have a conflict and is transmitted.

UE 115-*a* may identify the threshold 'X' as a UE capability and transmit an indication of the threshold 'X' to base station 105-*a* (e.g., in an RRC message). UE 115-*a* may receive an indication (e.g., via DCI) of a configuration for an aggregated slots or aggregated mini-slots transmission, where the signaling at least indicates the time and a candidate TCI beam for communicating aggregated slots. UE 115-*a* may determine a TCI beam for the transmission based on a combination of at least one of the time of transmitting a portion of the aggregated slots, the time that UE 115-*a* receives the indication, the threshold 'X', the candidate TCI state, and a pre-defined beam selection technique.

In some cases, the indication may be sent sufficiently ahead of time to send the aggregated slots by at least 'X', such that the indicated TCI beam is used for transmission of the aggregated slots. in some cases, the portion of the aggregated slots corresponds to a first slot in the aggregation, and UE 115-*a* may use the indicated TCI beam if the offset K0 is greater than or equal to the threshold; otherwise, UE 115-*a* may use a beam based on a TCI state of a configured control resource set with a lowest (or highest) ID. If the indication is transmitted in different occasions or was repeated, UE 115-*a* may use a predetermined portion to determine the receiving time. For example, UE 115-*a* may determine which slots are scheduled based on an offset from a latter received DCI (e.g., if the DCI is transmitted twice). UE 115-*a* may then transmit or receive the aggregated slot or aggregated mini-slot transmission based on the determined beam and configuration.

In some cases, UE 115-*a* may receive a second indication including a semi-static slot assignment. UE 115-*a* may identify any conflicts between the first and second slot configurations (e.g., between the DCI scheduling and the semi-static assignments). UE 115-*a* may determine whether to not expect or not to transmit for a portion of a slot aggregation which includes a directional conflict. UE 115-*a* may use at least part of the non-conflicting portion of the slot aggregation to determine the TCI state. For example, UE 115-*a* may determine the TCI state based on a first period (e.g., slot, mini-slot, or symbol) in time that does not have a conflict and is actually transmitted.

Figure 3:
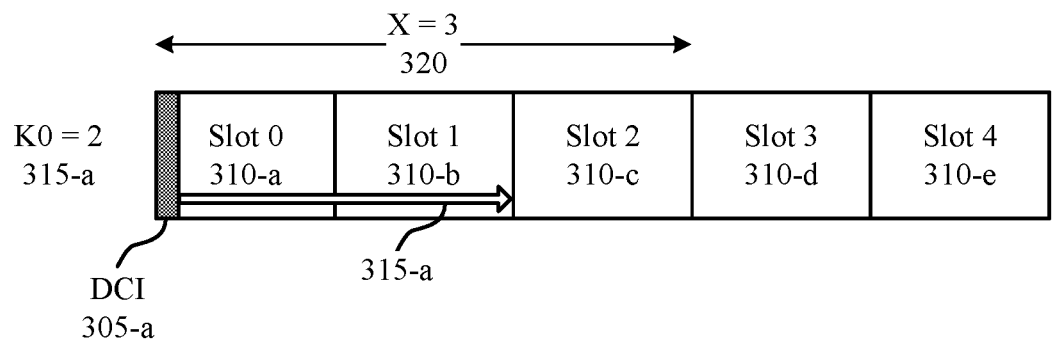
FIG. 3 illustrates an example of a TCI state determination that supports beam determination for a slot aggregation in accordance with aspects of the present disclosure.
Figure 3:
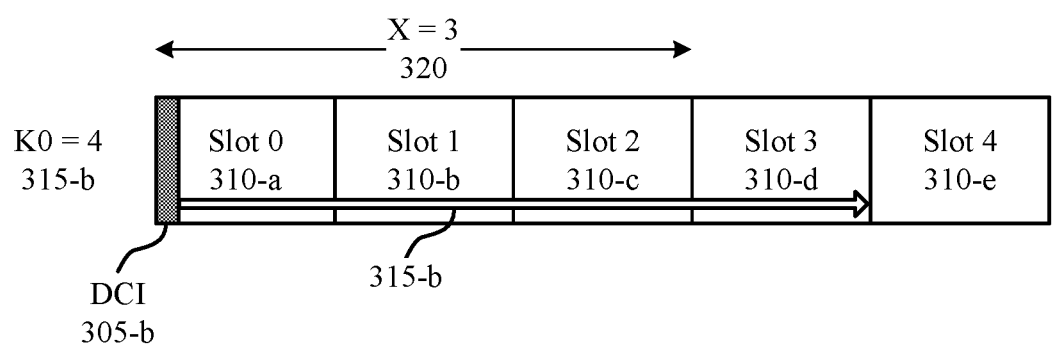

FIG. 3 illustrates an example of a TCI state determination 300 that supports beam determination for a slot aggregation in accordance with aspects of the present disclosure. In some examples, TCI state determination 300 may implement aspects of wireless communications system 100.

As described in FIG. 2, a base station 105 may transmit DCI 305 to a UE 115 which schedules one or more slots 310. The DCI 305 may also indicate a TCI state for the slots 310 scheduled by the DCI 305. In some cases, an RRC message may indicate that the TCI state of a slot 310 is included in the DCI 305 (e.g., by setting TCI-PresentInDCI in the RRC message).

The UE 115 may identify a time offset 315 (e.g., 'K0' as described herein) which corresponds to a time difference between the DCI 305 and a scheduled slot 310. For example, DCI 305-*a* may be transmitted in slot 310-*a* (e.g., Slot 0) and may schedule slot 310-*c* (e.g., Slot 2), so time offset 315-*a* may be 2 slots (e.g., K0=2). In another example shown, DCI 305-*b* may be transmitted in slot 310-*a* (e.g., Slot 0) and may schedule slot 310-*e* (e.g., Slot 4), so the time offset 315-*b* may be 4 slots (e.g., K0=4). In some cases, the scheduled slots (e.g., slot 310-*c* in the first example and slot 310-*e* in the second example) may be a first slot of a set of scheduled slots. For example, DCI 305-*a* may schedule slot 310-*c* and 310-*d*, among other slots. Similarly, DCI 305-*b* may schedule slot 310-*e* and other slots 310 not shown.

The UE 115 may identify a threshold 320 (e.g., 'X' as described in FIG. 2) corresponding to a time for the UE 115 to prepare for a new beam. For example, the threshold 320 may be based on the time it takes for the UE 115 to load a new receive/transmit beam configuration into the RF circuitry. In some cases, the UE 115 may report the threshold 320 as part of reporting UE capability. For example, the threshold 320 may be transmitted in an RRC message to the base station 105. The threshold 320 may be measured in slots, mini-slots, symbols, or other TTIs. For example, in the illustrated example, the threshold 320 is 3 slots, or 42 symbols, or a corresponding number of mini-slots.

The UE 115 may determine a TCI state to use for the scheduled slots. In some cases, the UE 115 may follow a set of rules for determining which TCI state to use. For example, if the time offset 315 between the DCI 305 and the scheduled slot 310 is less than the threshold 320, the UE 115 may be expected to use a beam QCL associated with the TCI beam for the lowest (or highest) value control resources set identifier in the latest control resource set configuration.

In an illustrated example, DCI 305-a schedules slot 310-c (e.g., Slot 2), such that time offset 315-a is less than the threshold 320 (e.g., K0<X). As shown, the time offset 315-a is 2 slots in this example, where the threshold 320 is three slots. Therefore, the UE 115 would use a beam QCL associated with the TCI beam for the lowest control resource set ID in the latest control resource set configuration.

In examples where the time offset 315 is larger than the threshold 320, the UE 115 may use the TCI state indicated by the DCI 305. As shown by the second example of FIG. 3, DCI 305-a schedules slot 310-e (e.g., Slot 4), such that time offset 315-b is greater than the threshold 320 (e.g., K0=4, X=3, and K0>3). Other examples may include different values for the time offset 315 or different values for the threshold 320. In some cases, if the time offset 315 is equal to the threshold 320, the UE 115 may either use the TCI state indicated by the DCI 305, or the UE 115 may use a beam QCL associated with the TCI beam for the lowest control resource set ID in the latest configuration. In some cases, the UE 115 may select which option to follow, or the UE 115 may be configured by the network to choose an option if K0 and X are equal.

In some cases, the base station 105 may ensure the DCI 305 schedules the UE 115 with a time offset 315 which is greater than the threshold 320. For example, the base station 105 may consider the threshold 320 signaled by the UE 115 when scheduling the UE 115.

Figure 4:
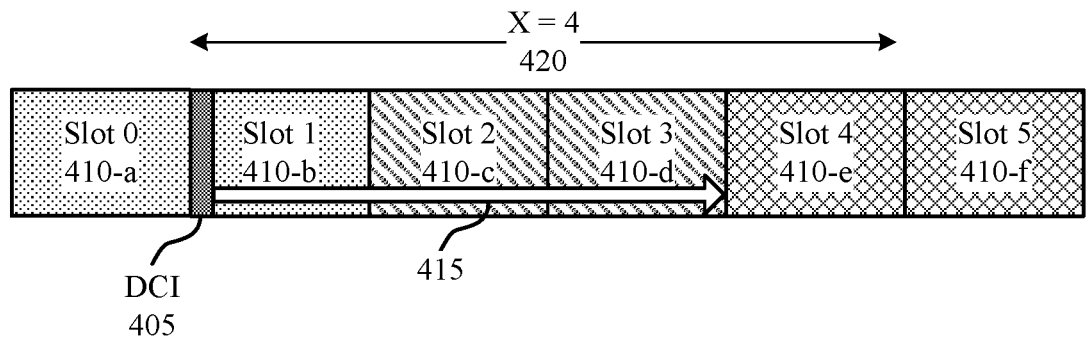
FIG. 4 illustrates an example of a TCI state determination for aggregated slots that supports beam determination for a slot aggregation in accordance with aspects of the present disclosure.
Figure 4:
Figure 4:
Figure 4:
Figure 4:
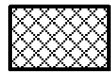

FIG. 4 illustrates an example of a TCI state determination for aggregated slots 400 that supports beam determination for a slot aggregation in accordance with aspects of the present disclosure. In some examples, TCI state determination for aggregated slots 400 may implement aspects of wireless communications system 100.

As described in FIG. 2, a base station 105 may transmit DCI 405 to a UE 115 which schedules one or more slots 410. The DCI 405 may also indicate a TCI state for the slots 410 scheduled by the DCI 405. The UE 115 may identify a time offset 415 (e.g., 'K0' as described herein) which corresponds to a time difference between the DCI 405 and a scheduled slot 410.

In some cases, the base station 105 and UE 115 may be in a wireless communications system which supports slot aggregation. For slot aggregation, the base station 105 may transmit the same TB, repeated in each symbol allocation among each of the aggregated slots 425. The UE 115 may receive the repeated transport blocks and soft combine across the aggregated slots 425, which may improve decoding performance. In some cases, the aggregated slots 425 may use the same MCS and have the same RE allocation. In some examples, the aggregated slots 425 may also have the same TBS and basic graph for LDPC. In some cases, the number of slots 410 in aggregated slots 425 may be semi-statically (e.g., via RRC signaling) or dynamically configured (e.g., via DCI 405).

In an example, slot 410-a (e.g., Slot 0) and slot 410-b (Slot 1) may make up aggregated slots 425-a and carry the same transport block. For example, a first slot and a second slot may be configured for slot aggregation, where the same transport block is transmitted in both slots. Similarly, slot 410-c and slot 410-d may be aggregated slots 425-b, and slots 410-e and 410-f may be aggregated slots 425-c.

The base station 105 may transmit higher layer RRC signaling to served UEs 115 to indicate the slot aggregation. For physical downlink shared channel (PDSCH) and physical uplink shared channel (PUSCH) signaling, slot aggregation may be indicated if the aggregation factor parameter is greater than 1 (e.g., aggregationFactorUL>1 for PUSCH or aggregationFactorDL>1 for PDSCH).

In some cases, the base station 105 may transmit DCI 405 indicating a TCI beam for scheduled, aggregated slots. For example, the base station 105 may transmit the DCI 405 in slot 410-b (e.g., Slot 1) indicating a TCI beam for the slots 410-e and 410-f (e.g., Slots 4 and 5 respectively), where Slot 4 and Slot 5 carry the same transport block. In this example, the UE capability threshold for beam switching may be 4 slots, such that the first slot of the aggregated slots 425-c (e.g., slot 410-e or Slot 4) may be before the threshold, and the second slot of the aggregated slots 425-c (e.g., slot 410-f or Slot 5) may be after the threshold. By a conventional TCI determination rule, UE 115-a would use a different beams for slot 410-e and slot 410-f. Then, slots 410-e and 410-f would have different SNR values, while the MCS in those slots 410 are kept the same. This may impair decoding performance at the receiving device.

Instead, when the base station 105 uses DCI signaling to schedule aggregated slots 425, the minimum offset (e.g., the time offset 415) to the first slot 410 of the aggregated slots 425 may be larger than the threshold 420. The base station 105 may ensure the time offset 415 to the first scheduled slot is larger than the threshold 420 when scheduling the UE 115. For example, the base station 105 may transmit the DCI 405 scheduling the aggregated slots 425-c in slot 410-a (e.g., Slot 0) such that both slots in the aggregated slots 425-c are after the threshold 420.

In another example, the UE 115 may use the same beam for all slots 410 in the aggregated slots 425, where the first slot of the aggregation determines the time offset 415 and the corresponding TCI beam. For example, the UE 115 may not switch to a different beam for slot 410-f in the illustrated example and may instead use the same beam as used for slot 410-e.

Figure 5:
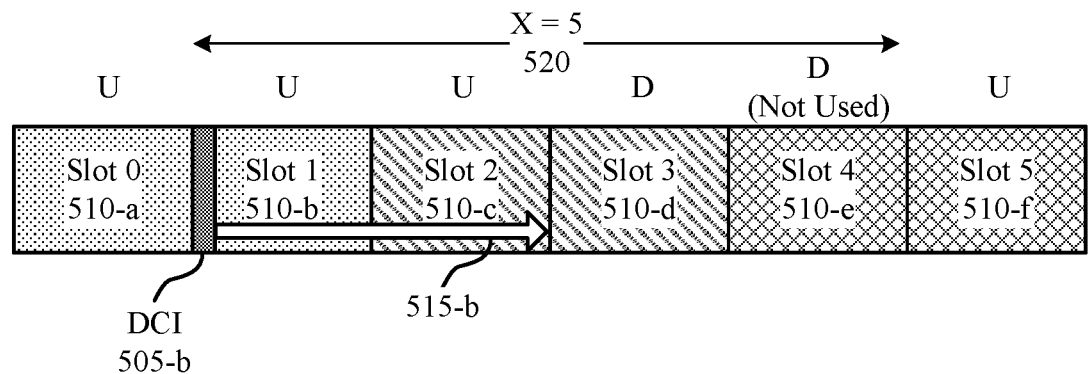
FIG. 5 illustrates an example of a TCI state determination for aggregated slots that supports beam determination for a slot aggregation in accordance with aspects of the present disclosure.
Figure 5:
Figure 5:
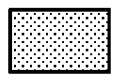
Figure 5:
Figure 5:
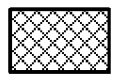

FIG. 5 illustrates an example of a TCI state determination for aggregated slots 500 that supports beam determination for a slot aggregation in accordance with aspects of the present disclosure. In some examples, TCI state determination for aggregated slots 500 may implement aspects of wireless communications system 100.

As described in FIG. 2, a base station 105 may transmit DCI 505 to a UE 115 which schedules one or more slots 510. The DCI 505 may also indicate a TCI state for the slots 510 scheduled by the DCI 505. The UE 115 may identify a time offset 515 (e.g., 'K0' as described herein) which corresponds to a time difference between the DCI 405 and a scheduled slot 510. The UE 115 may have a UE capability related to the time it takes for the UE 115 to switch beams, where that time is shown by a threshold 520 (e.g., 'X'). Further, the slots 510 may be configured for slot aggregation, and may be transmitted as aggregated slots 525. For example, aggregated slot 525-*a* may include slot 510-*a* and 510-*b*, where both slots 510-*a* and 510-*b* carry the same transport block.

The UE 115 and the base station 105 may also be in a wireless communications system which supports semi-static uplink/downlink assignments. For example, the base station 105 may use RRC signaling to indicate a semi-static slot configuration to the UE 115 in advance. The semi-static slot configuration may indicate which of the slots 510 are configured for uplink or configured for downlink, or which of the slots are 'flexible' (e.g., can be used for uplink and downlink based on scheduling). An example semi-static assignment may assign slot 510-*a* as uplink, slot 510-*b* as uplink, slot 510-*c* as uplink, slot 510-*d* as downlink, 510-*e* as downlink, and slot 510-*f* as uplink.

In some cases, a grant in the DCI 505 may schedule a conflicting direction for a slot 510 configured by the semi-static configuration. For example, if the DCI 505 schedules a slot 510 for downlink transmission when that slot 510 was indicated by the semi-static configuration to be uplink, that slot 510 may not be used for transmission.

In some cases, there may be a conflicting direction for a slot which is aggregated with other slots. For example, a semi-static configuration may indicate slot 510-*e* of aggregated slots 525-*c* is configured for downlink, but DCI 505 may schedule the aggregated slots 525-*c* for uplink. Therefore, slot 510-*e* may not be used for transmission. Slot 510-*f* may still be used to transmit uplink information.

In some cases, the DCI 505 may also indicate a TCI state for the aggregated slots 525-*c*, and there may be a split in TCI states between slot 510-*e* (Slot 4) and slot 510-*f* (Slot 5) of the aggregated slots 525-*c*. For example, slot 510-*e* may be before the threshold 520 and slot 510-*f* may be after the threshold 520. In some cases, slot 510-*e* would use the lowest control resource set ID beam and slot 510-*f* would use the DCI-indicated beam.

In some cases, the indicated TCI beam may provide better SNR. Therefore, since slot 510-*e* is not used due to the directional conflict, slot 510-*f* may use the TCI beam indicated by the DCI 505. As such, the UE 115 may select a beam based on the DCI-indicated TCI state when there is a directional conflict within aggregated slots 525 as described.

In the described aggregated slot case, the UE 115 and base station 105 may use the time location of the first actually transmitted slot to determine an adjusted K0 and use the adjusted K0 to determine which TCI beam to use. For example, if a first slot of the slot aggregation is not actually transmitted, the UE 115 and base station 105 may select beams based on a subsequent, actually transmitted slot. For example, slot 510-*e* of the aggregated slots 525-*c* is not actually transmitted, so the UE 115 and the base station 105 may use an adjusted K0 which is based on slot 510-*f*, which is actually used for transmission. Thus, the adjusted K0 may be different from the K0 indicated in DCI (e.g., as the K0 in DCI may indicate slot 510-*e*).

Figure 6:
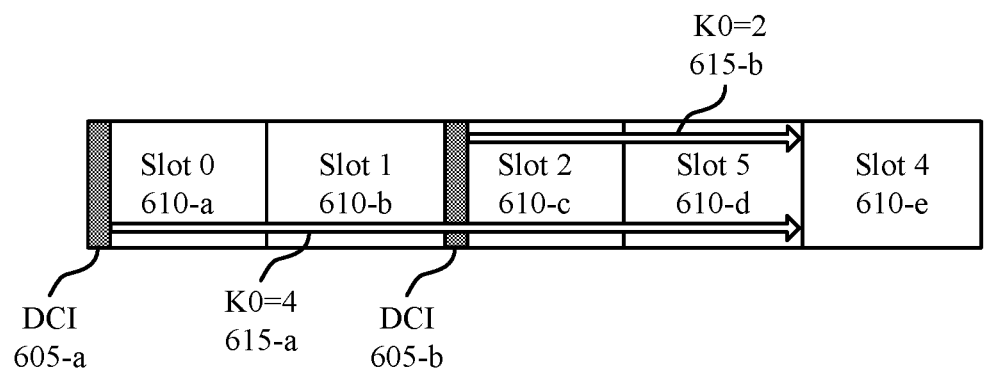
FIG. 6 illustrates an example of repeated control signaling that supports beam determination for a slot aggregation in accordance with aspects of the present disclosure.

FIG. 6 illustrates an example of a repeated control signaling 600 that supports beam determination for a slot aggregation in accordance with aspects of the present disclosure. In some examples, repeated control signaling 600 may implement aspects of wireless communications system 100.

In some cases, a base station 105 may transmit DCI 605 in multiple different slots 610 to increase robustness for PDCCH. The PDCCH scheduling the same slot may be repeated in 2, or more, slots. For example, the base station 105 may transmit the DCI 605 in two different slots, but the DCI 605 may carry the same scheduling information. For example, DCI 605-*a* in slot 610-*a* and DCI 605-*b* in slot 610-*c* may both carry scheduling information for slot 610-*e*. To determine the offset 615 between the DCI 605 and the scheduled slot, the base station 105 may specify which PDCCH is used as a reference. For example, DCI 605-*a* may specify K0=4, as slot 610-*e* is 4 slots later than slot 610-*a*. Similarly, DCI 605-*b* may specify K0=2 as slot 610-*e* is 2 slots later than slot 610-*c*. In some cases, the offset 615 may be counted from the last symbol of the appearance of the scheduling DCI (e.g., from DCI 605-*b*). Or, in some cases, the time offset 515 can count from earlier (e.g., from DCI 605-*a*).

Figure 7:
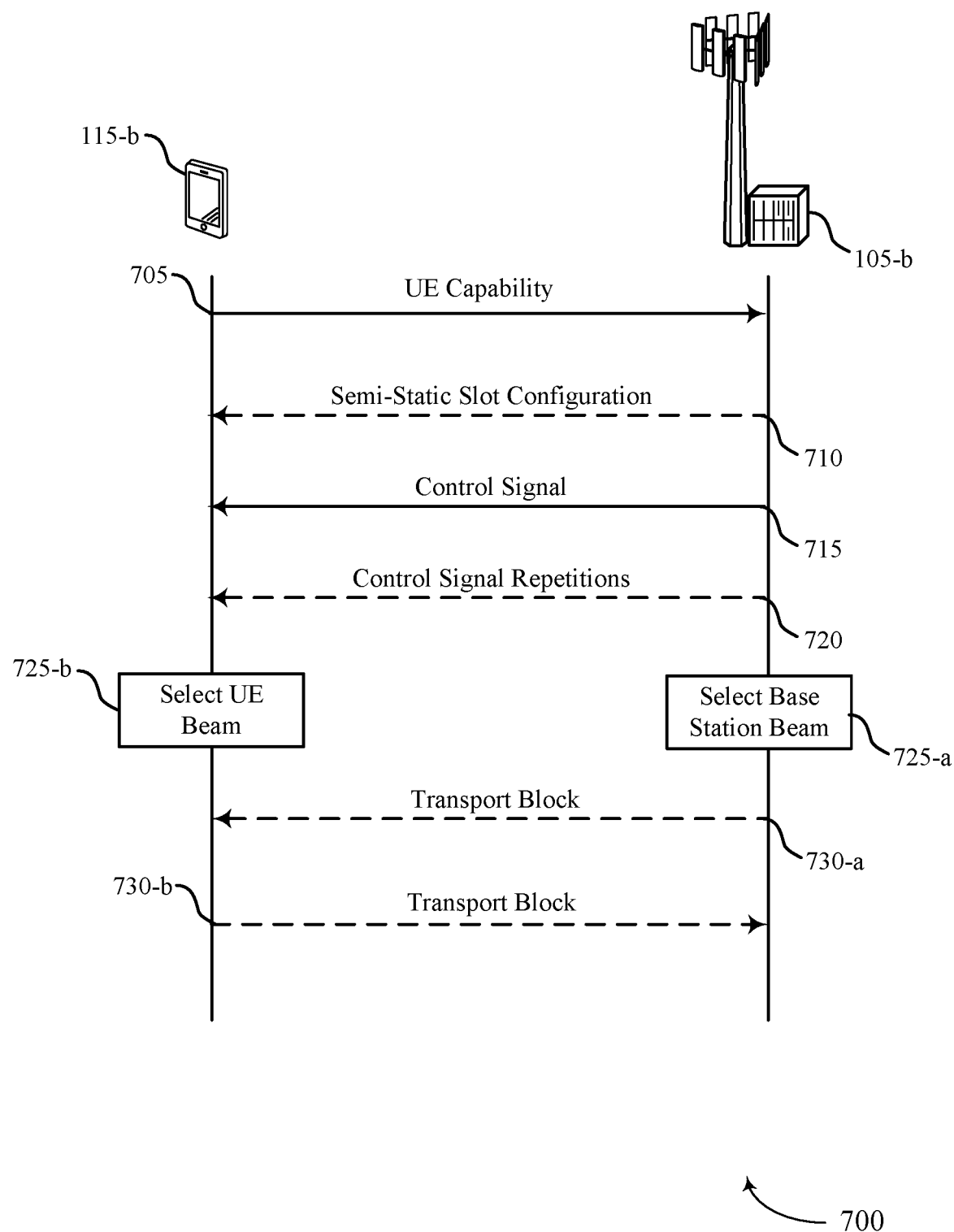
FIG. 7 illustrates an example of a process flow that supports beam determination for a slot aggregation in accordance with aspects of the present disclosure.

FIG. 7 illustrates an example of a process flow 700 that supports beam determination for a slot aggregation in accordance with aspects of the present disclosure. In some examples, process flow 700 may implement aspects of wireless communications system 100. Process flow 700 may include UE 115-*b* and base station 105-*b*, which may be respective examples of a UE 115 and a base station 105 described herein.

At 705, UE 115-*b* may transmit, to base station 105-*b*, an indication of a UE capability associated with beam changing at UE 115-*b*. For example, the capability may be associated with a time needed for UE 115-*b* to prepare a new beam by loading the new receive/transmit beam configuration into RF circuitry of UE 115-*b*. In some cases, the indication of the UE capability may be transmitted in an RRC message, for example as part of reporting UE capability.

In some cases, base station 105-*b* may transmit a semi-static slot configuration to UE 115-*b* at 710. For example, the semi-static slot configuration may indicate a transmission direction (e.g., uplink, downlink, or flexible) for upcoming slots. As an example, the semi-static slot configuration may indicate [U,U,D,D,D], indicating that a first two slots are configured for uplink and the third through fifth slots are configured for downlink.

At 715, UE 115-*b* may receive, from base station 105-*b* during a scheduling slot, a control signal including a TCI and a grant for a transport block over a first slot aggregation including a set of slots. At 725-*a*, base station 105-*b* may select a UE beam to use. At 725-*b*, UE 115-*b* may select a receive beam to use.

In some cases, UE 115-*b* may select the UE beam based on a difference between a minimum time offset threshold and the offset between the scheduling slot and the sequentially first slot of the at least one slot, where the minimum time offset threshold is based on the indicated UE capability. For example, the UE beam may be selected based on 'X' (e.g., the minimum time offset threshold) and K0 (e.g., the offset between the scheduling slot and the sequentially first slot of the at least one slot). In some examples, selecting the UE beam includes selecting a receive beam indicated by the TCI if the minimum time offset threshold is less than the offset between the scheduling slot and the sequentially first slot of the at least one slot. For example, if 'X' is less than K0, UE 115-*b* may use the TCI state indicated in the control signal transmitted at 715. In some other examples, selecting the UE beam includes selecting a default beam if the minimum time offset threshold is greater than the offset between the scheduling slot and the sequentially first slot of the at least one slot. For example, UE 115-*a* may select a beam QCL associated with the TCI beam for the lowest control resource set ID in the latest control resource set configuration.

In some cases, each slot of the first slot aggregation may be offset from the scheduling slot according to a scheduling constraint based on the indicated UE capability. The UE capability may indicate a minimum time offset threshold between the scheduling slot and the first slot aggregation, and the first slot aggregation may occur after the minimum time offset threshold from the scheduling slot. Base station 105-*b* may determine the minimum time offset threshold from the scheduling slot based on the UE capability and select the set of slots such that the first slot aggregation occurs after the minimum time offset threshold from the scheduling slot. For example, base station 105-*b* may schedule UE 115-*b* such that K0 is greater than 'X'.

In some cases, at 720, base station 105-*b* may transmit a set of repetitions of the control signal over a second slot aggregation occurring prior to a first slot aggregation. In some examples, the scheduling slot may include a slot carrying a last repetition of the set of repetitions of the control signal. In some other examples, the scheduling slot may include a slot carrying the first repetition of the set of repetitions of the control signal.

The transport block may be configured for uplink transmission or downlink transmission. At 730, UE 115-*b* may transmit or receive at least one instance of the transport block over at least one slot of the first slot aggregation using the UE beam, where the UE beam is selected based on the UE capability, the offset between the scheduling slot and a sequentially first slot of the at least one slot, and the TCI. For example, UE 115-*b* may receive the transport block at 730-*a*, or UE 115-*b* may receive the transport block at 730-*b*.

In some cases, for example if each slot of the first slot aggregation is offset from the scheduling slot according to the scheduling restraint, UE 115-*b* may transmit or receive the transport block over the first slot aggregation using a UE beam based on the TCI. For example, UE 115-*b* may use the TCI included in the control signal.

Figure 8:
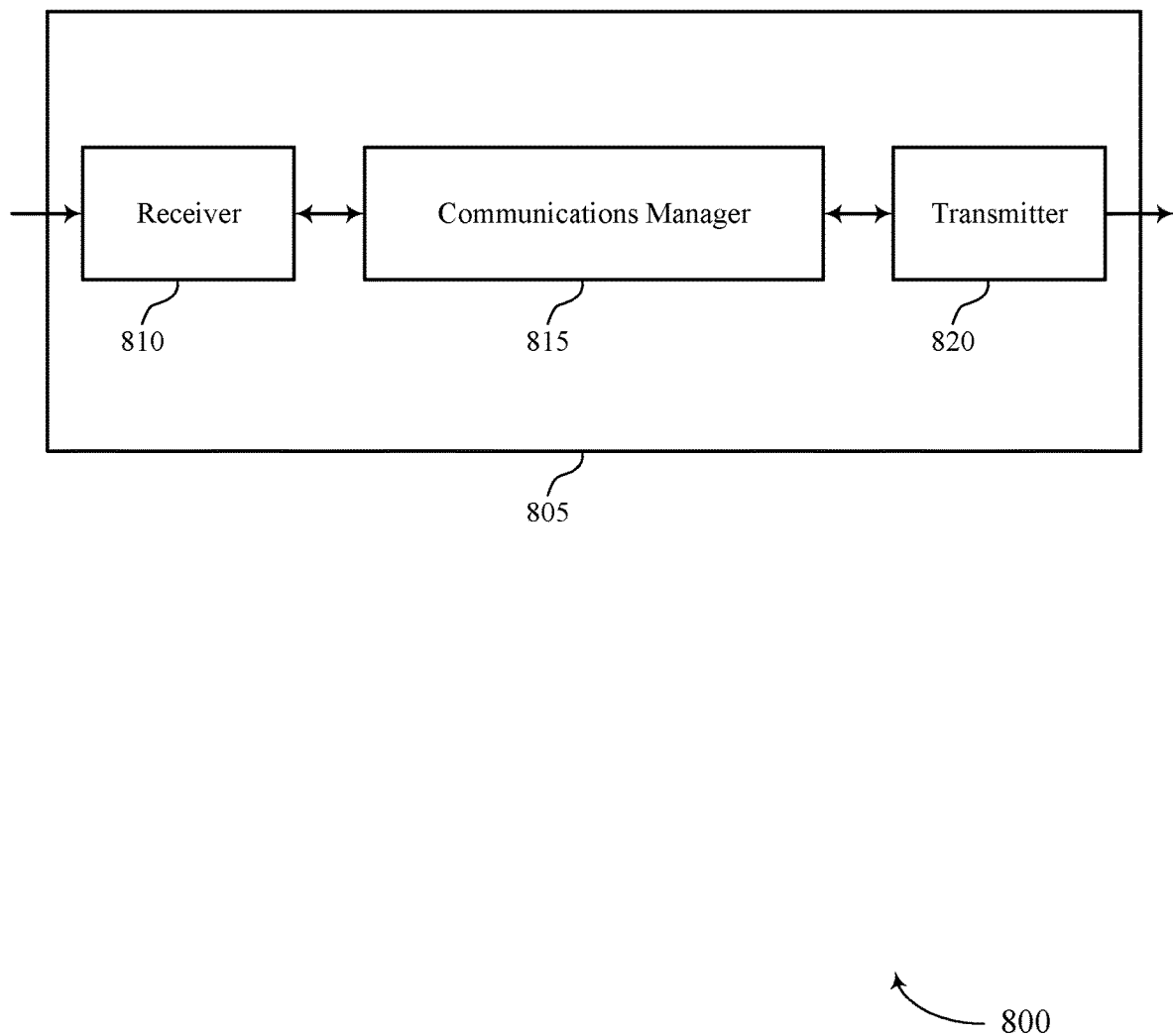
FIGS. 8 and 9 show block diagrams of devices that support beam determination for a slot aggregation in accordance with aspects of the present disclosure.

FIG. 8 shows a block diagram 800 of a device 805 that supports beam determination for a slot aggregation in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam determination for a slot aggregation, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit to a base station an indication of a UE capability associated with a beam change at the UE, receive from the base station during a scheduling slot a control signal including a transmission configuration indicator (TCI) and a grant for a transport block over a first slot aggregation including a set of slots, and transmit or receiving at least one instance of the transport block over at least one slot of the first slot aggregation using a UE beam, where the UE beam is selected based on the UE capability, an offset between the scheduling slot and a sequentially first slot of the at least one slot, and the TCI. The communications manager 815 may also transmit to a base station an indication of a UE capability associated with a beam change at the UE, receive from the base station during a scheduling slot a control signal including a transmission configuration indicator (TCI) and a grant for a transport block over a first slot aggregation including a set of slots, where each slot of the first slot aggregation is offset from the scheduling slot according to a scheduling constraint based on the indicated UE capability, and transmit or receiving the transport block over the first slot aggregation using a UE beam based on the transmission configuration indicator. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
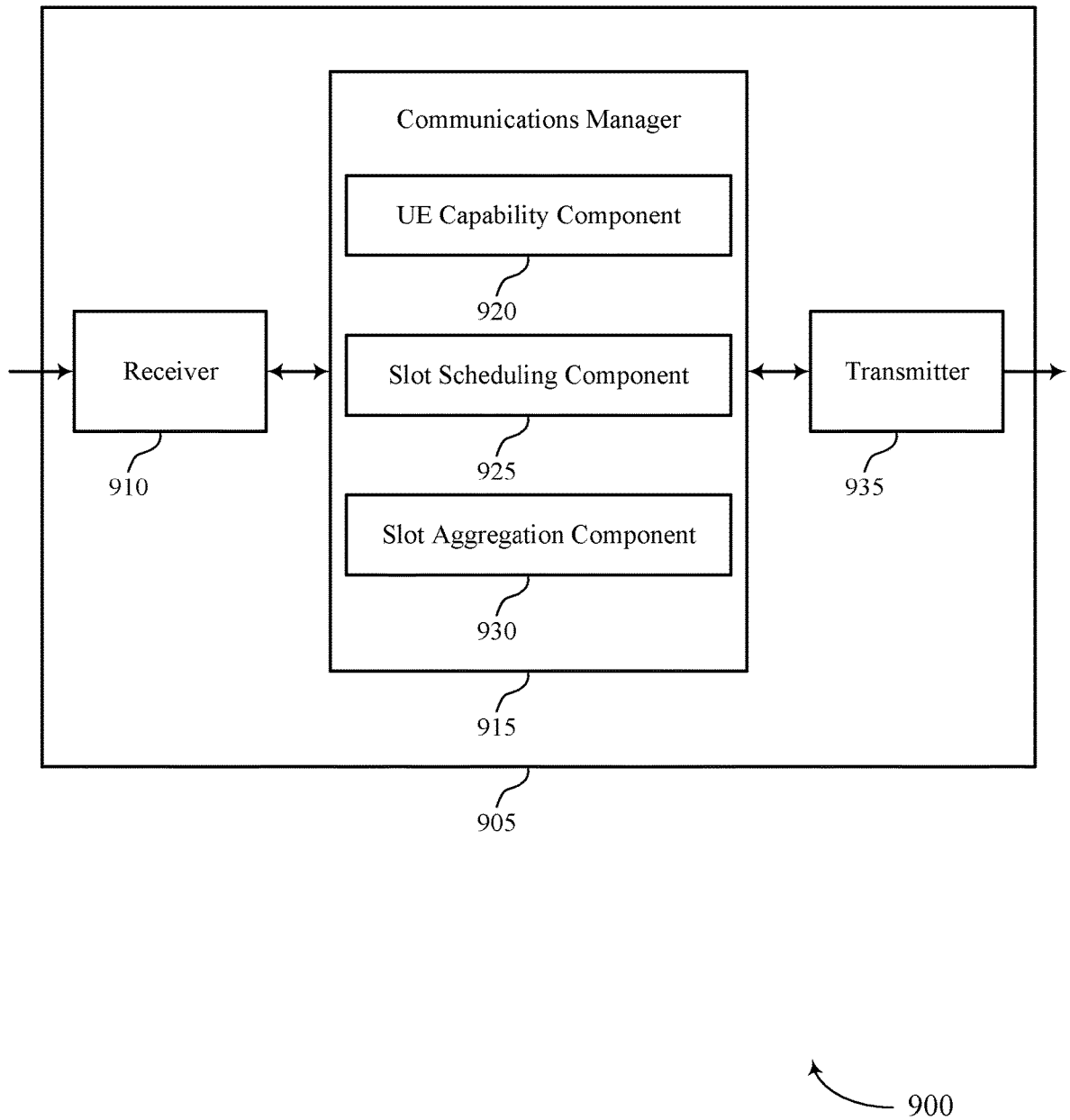

FIG. 9 shows a block diagram 900 of a device 905 that supports beam determination for a slot aggregation in accordance with aspects of the present disclosure. The device 905 may be an example of aspects of a device 805 or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam determination for a slot aggregation, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a UE capability component 920, a slot scheduling component 925, and a slot aggregation component 930. The communications manager 915 may be an example of aspects of the communications manager 1110 described herein.

The UE capability component 920 may transmit to a base station an indication of a UE capability associated with a beam change at the UE. The slot scheduling component 925 may receive from the base station during a scheduling slot a control signal including a TCI and a grant for a transport block over a first slot aggregation including a set of slots. The slot aggregation component 930 may transmit or receiving at least one instance of the transport block over at least one slot of the first slot aggregation using a UE beam, where the UE beam is selected based on the UE capability, an offset between the scheduling slot and a sequentially first slot of the at least one slot, and the TCI.

The UE capability component 920 may transmit to a base station an indication of a UE capability associated with a beam change at the UE. The slot scheduling component 925 may receive from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability. The slot aggregation component 930 may transmit or receiving the transport block over the first slot aggregation using a UE beam based on the transmission configuration indicator.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
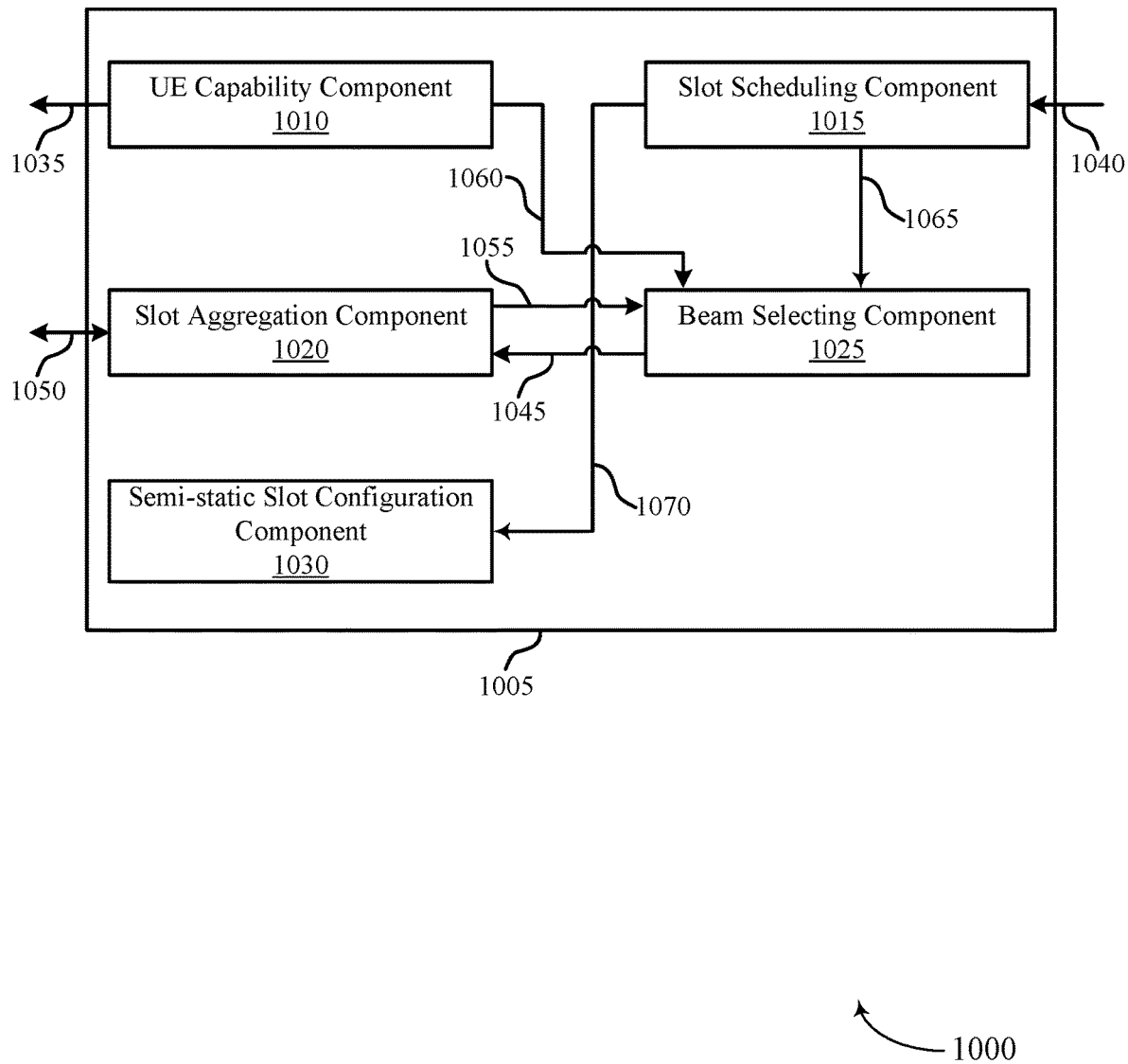
FIG. 10 shows a block diagram of a communications manager that supports beam determination for a slot aggregation in accordance with aspects of the present disclosure.

FIG. 10 shows a block diagram 1000 of a communications manager 1005 that supports beam determination for a slot aggregation in accordance with aspects of the present disclosure. The communications manager 1005 may be an example of aspects of a communications manager 815, a communications manager 915, or a communications manager 1110 described herein. The communications manager 1005 may include a UE capability component 1010, a slot scheduling component 1015, a slot aggregation component 1020, a beam selecting component 1025, and a semi-static slot configuration component 1030. Each of these modules may communicate, directly or indirectly, with one another (e.g., via one or more buses).

The UE capability component 1010 may transmit to a base station an indication of a UE capability, e.g., a UE capability indication 1035, associated with a beam change at the UE.

The slot scheduling component 1015 may receive from the base station during a scheduling slot a control signal 1040 including a transmission configuration indicator (TCI) and a grant for a transport block over a first slot aggregation including a set of slots.

In some examples, receiving the control signal 1040 includes receiving a set of repetitions of the control signal 1040 over a second slot aggregation occurring prior to the first slot aggregation. In some cases, the scheduling slot includes a slot carrying a last repetition of the set of repetitions of the control signal 1040. In some cases, the scheduling slot includes a slot carrying a first repetition of the set of repetitions of the control signal 1040.

The slot aggregation component 1020 may receive UE beam information 1045, which may include some information of the control signal 1040 from beam selecting component 1025. The information from control signal 1040 may include the transmission configuration indicator (TCI) and the grant for a transport block over the first slot aggregation. The slot aggregation component 1020 may transmit or receive at least one instance of the transport block over at least one slot of the first slot aggregation using a UE beam 1050, where the UE beam 1050 is selected based on the UE capability information 1060, an offset between the scheduling slot and a sequentially first slot of the at least one slot (e.g. offset information 1055), and the TCI.

The UE capability component 1010 may send UE capability information 1060 to beam selecting component 1025. The slot scheduling component 1015 may send slot scheduling information 1065 to the beam selecting component 1025, which may include control signal 1040's information. The slot aggregation component 1020 may send offset information 1055 to beam selecting component 1025. The beam selecting component 1025 may select the UE beam 1050 based on a difference between a minimum time offset threshold and the offset between the scheduling slot and the sequentially first slot of the at least one slot of offset information 1055, where the minimum time offset threshold is based on the indicated UE capability information 1060. In some examples, selecting the UE beam 1050 includes selecting a receive beam indicated by the TCI if the minimum time offset threshold is less than the offset between the scheduling slot and the sequentially first slot of the at least one slot of offset information 1055. In some examples, selecting the UE beam 1050 includes selecting a default beam if the minimum time offset threshold is greater than the offset between the scheduling slot and the sequentially first slot of the at least one slot of offset information 1055.

The semi-static slot configuration component 1030 may receive a semi-static slot configuration 1070 from the slot scheduling component 1015, where a portion of the first slot aggregation conflicts with the semi-static slot configuration. In some examples, the semi-static slot configuration component 1030 may ignore a portion of the first slot aggregation that conflicts with the semi-static slot configuration. In some examples, the sequentially first slot of the at least one slot is a first slot of a second portion of the first slot aggregation that does not conflict with the semi-static slot configuration.

In some examples, the UE capability component 1010 may transmit to a base station an indication of a UE capability, e.g., a UE capability indication 1035, associated with a beam change at the UE. In some cases, the UE capability indication 1035 indicates a minimum time offset threshold between the scheduling slot and the first slot aggregation, and the first slot aggregation occurs after the minimum time offset threshold from the scheduling slot.

In some examples, the slot scheduling component 1015 may receive from the base station during a scheduling slot a control signal 1040 including a TCI and a grant for a transport block over a first slot aggregation including a set of slots, where each slot of the first slot aggregation is offset from the scheduling slot according to a scheduling constraint based on the indicated UE capability indication 1035.

In some examples, the slot scheduling component 1015 may receive a set of repetitions of the control signal 1040 over a second slot aggregation occurring prior to the first slot aggregation. In some cases, the scheduling slot includes a slot carrying a last repetition of the set of repetitions of the control signal 1040. In some cases, the scheduling slot includes a slot carrying a first repetition of the set of repetitions of the control signal 1040.

The slot aggregation component 1020 may receive UE beam information 1045, which may include some information of the control signal 1040 from beam selecting component 1025. The information from control signal 1040 may include the transmission configuration indicator (TCI) and the grant for a transport block over the first slot aggregation. In some examples, the slot aggregation component 1020 may transmit or receive the transport block over the first slot aggregation using a UE beam 1050 based on the transmission configuration indicator.

Figure 11:
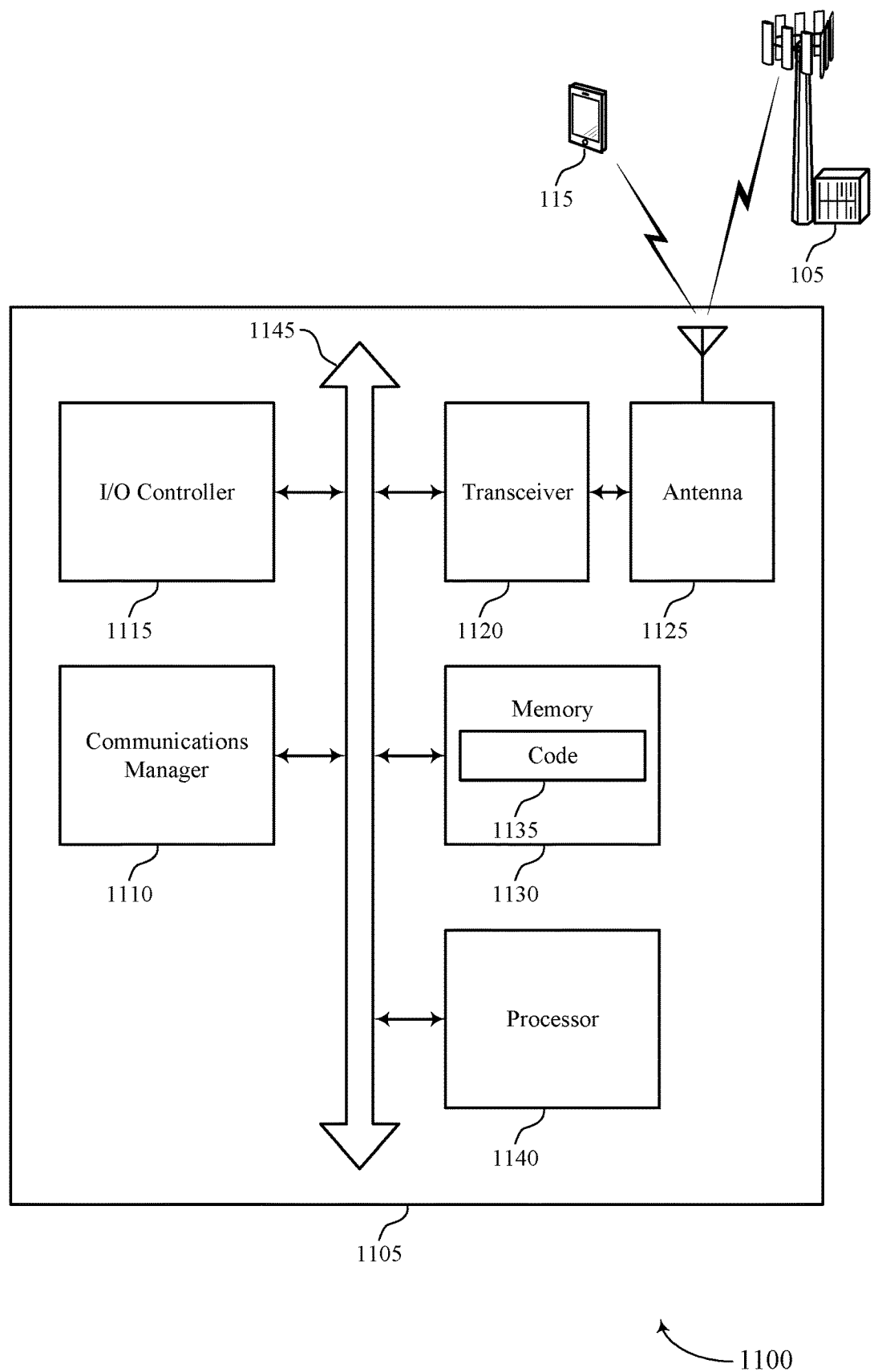
FIG. 11 shows a diagram of a system including a device that supports beam determination for a slot aggregation in accordance with aspects of the present disclosure.

FIG. 11 shows a diagram of a system 1100 including a device 1105 that supports beam determination for a slot aggregation in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may transmit to a base station an indication of a UE capability associated with a beam change at the UE, receive from the base station during a scheduling slot a control signal including a TCI and a grant for a transport block over a first slot aggregation including a set of slots, and transmit or receiving at least one instance of the transport block over at least one slot of the first slot aggregation using a UE beam, where the UE beam is selected based on the UE capability, an offset between the scheduling slot and a sequentially first slot of the at least one slot, and the TCI. The communications manager 1110 may also transmit to a base station an indication of a UE capability associated with a beam change at the UE, receive from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the first slot aggregation using a UE beam based on the transmission configuration indicator.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam determination for a slot aggregation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
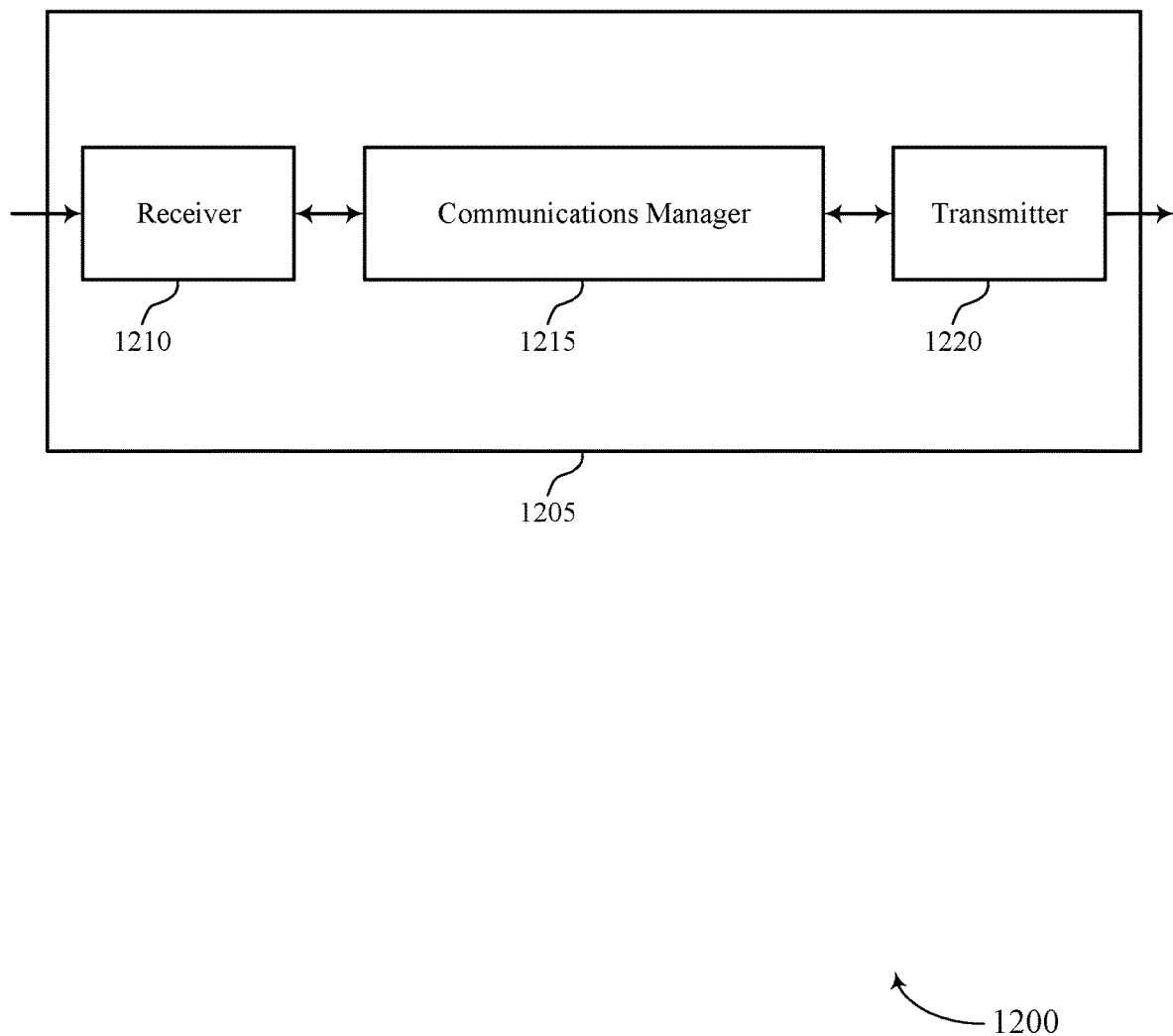
FIGS. 12 and 13 show block diagrams of devices that support beam determination for a slot aggregation in accordance with aspects of the present disclosure.

FIG. 12 shows a block diagram 1200 of a device 1205 that supports beam determination for a slot aggregation in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to beam determination for a slot aggregation, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive from a UE an indication of a UE capability associated with a beam change at the UE, transmit during a scheduling slot a control signal including a TCI and a grant for a transport block over a first slot aggregation including a set of slots, and transmit or receiving at least one instance of the transport block over at least one slot of the first slot aggregation using a base station beam, where the base station beam is selected based on the UE capability, an offset between the scheduling slot and a sequentially first slot of the at least one slot, and the TCI. The communications manager 1215 may also receive from a UE an indication of a UE capability associated with a beam change at the UE, transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the slot aggregation using a base station beam based on the TCI. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
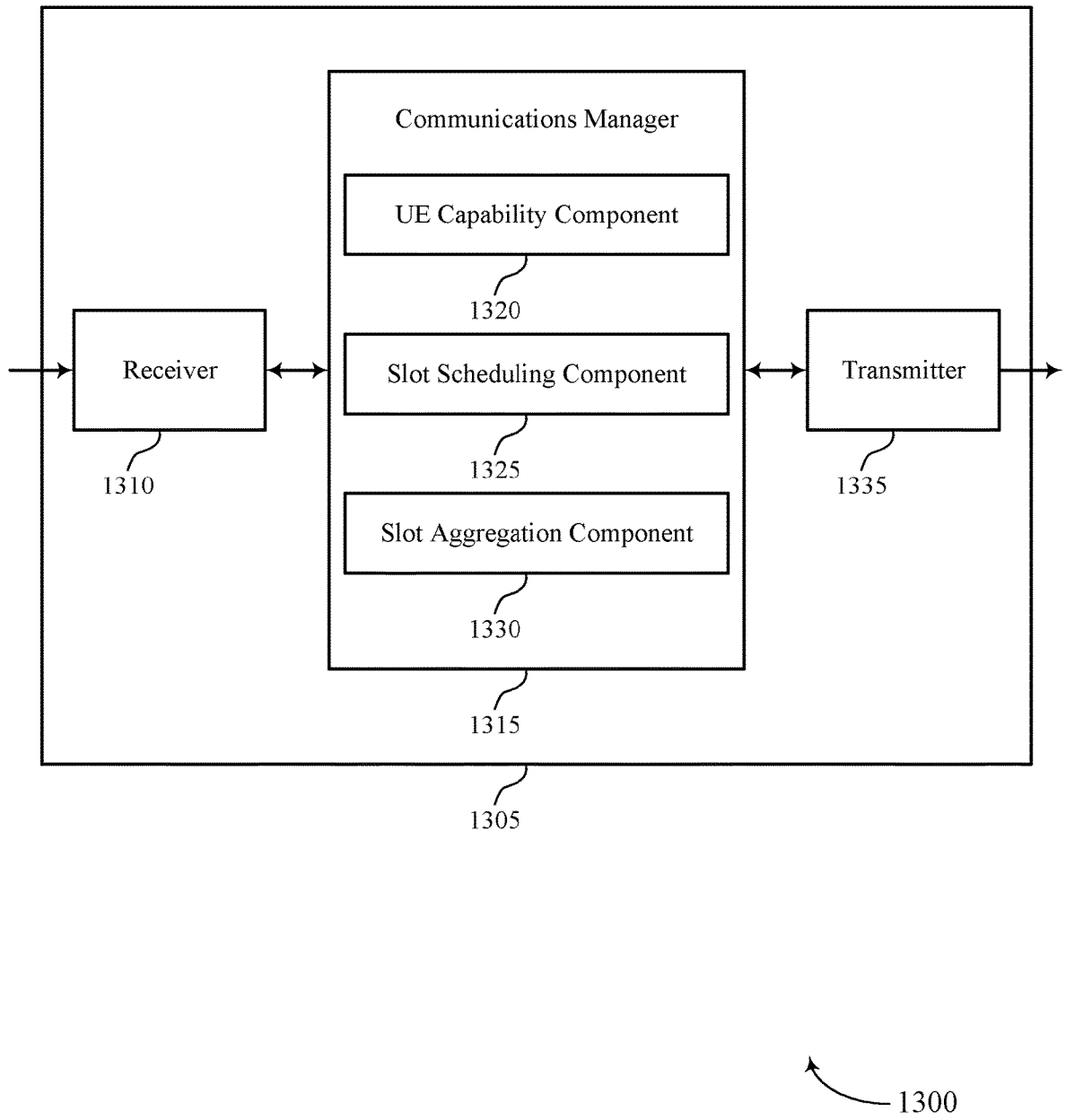

FIG. 13 shows a block diagram 1300 of a device 1305 that supports beam determination for a slot aggregation in accordance with aspects of the present disclosure. The device 1305 may be an example of aspects of a device 1205 or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to beam determination for a slot aggregation, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a UE capability component 1320, a slot scheduling component 1325, and a slot aggregation component 1330.

The communications manager 1315 may be an example of aspects of the communications manager 1510 described herein.

The UE capability component 1320 may receive from a UE an indication of a UE capability associated with a beam change at the UE. The slot scheduling component 1325 may transmit during a scheduling slot a control signal including a TCI and a grant for a transport block over a first slot aggregation including a set of slots. The slot aggregation component 1330 may transmit or receiving at least one instance of the transport block over at least one slot of the first slot aggregation using a base station beam, where the base station beam is selected based on the UE capability, an offset between the scheduling slot and a sequentially first slot of the at least one slot, and the TCI.

The UE capability component 1320 may receive from a UE an indication of a UE capability associated with a beam change at the UE. The slot scheduling component 1325 may transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability. The slot aggregation component 1330 may transmit or receiving the transport block over the slot aggregation using a base station beam based on the TCI.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
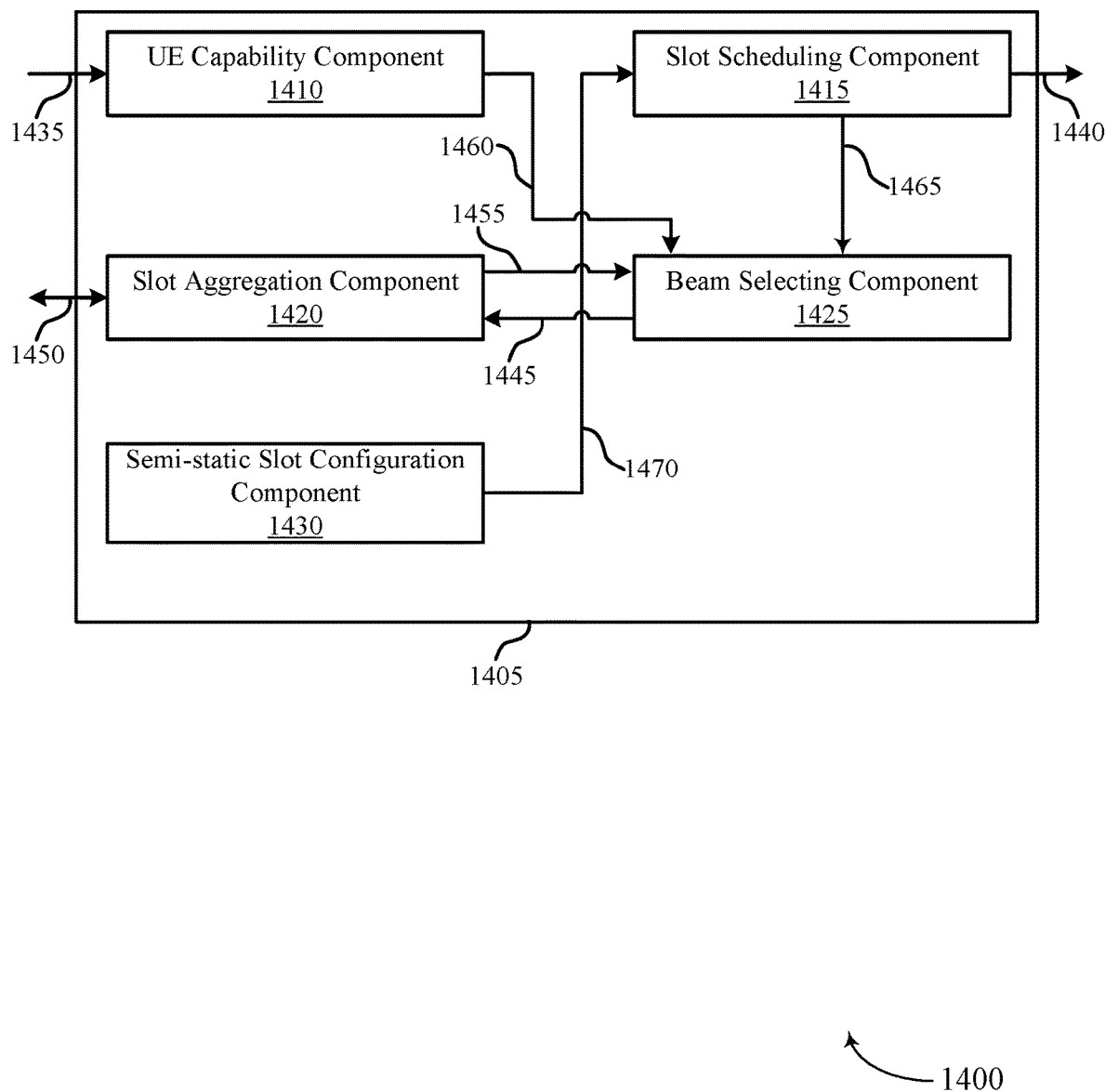
FIG. 14 shows a block diagram of a communications manager that supports beam determination for a slot aggregation in accordance with aspects of the present disclosure.

FIG. 14 shows a block diagram 1400 of a communications manager 1405 that supports beam determination for a slot aggregation in accordance with aspects of the present disclosure. The communications manager 1405 may be an example of aspects of a communications manager 1215, a communications manager 1315, or a communications manager 1510 described herein. The communications manager 1405 may include a UE capability component 1410, a slot scheduling component 1415, a slot aggregation component 1420, a beam selecting component 1425, and a semi-static slot configuration component 1430. Each of these modules may communicate, directly or indirectly, with one another (e.g., via one or more buses).

The UE capability component 1410 may receive from a UE an indication of a UE capability, e.g., a UE capability indication 1435, associated with a beam change at the UE.

The slot scheduling component 1415 may transmit during a scheduling slot a control signal 1440 including a TCI and a grant for a transport block over a first slot aggregation including a set of slots. In some examples, the slot scheduling component 1415 may transmit a set of repetitions of the control signal 1440 over a second slot aggregation occurring prior to the first slot aggregation. In some cases, the scheduling slot includes a slot carrying a last repetition of the set of repetitions of the control signal 1440. In some cases, the scheduling slot includes a slot carrying a first repetition of the set of repetitions of the control signal 1440.

The slot aggregation component 1420 may receive base station beam information 1445, which may include some information of the control signal 1440 from beam selecting component 1425. Some of the information from control signal 1440 may include the transmission configuration indicator (TCI) and the grant for a transport block over the first slot aggregation. The slot aggregation component 1420 may transmit or receive at least one instance of the transport block over at least one slot of the first slot aggregation using a base station beam 1450, where the base station beam 1450 is selected based on the UE capability information 1460, an offset between the scheduling slot and a sequentially first slot of the at least one slot, e.g., offset information 1455, and the TCI.

The UE capability component 1410 may send UE capability information 1460 to beam selecting component 1425. The slot scheduling component 1415 may send slot scheduling information 1465 to the beam selecting component 1425, which may include control signal 1440's information. The slot aggregation component 1420 may send offset information 1455 to beam selecting component 1425. The beam selecting component 1425 may determine a minimum time offset threshold from the scheduling slot based on the UE capability information 1460. In some examples, the beam selecting component 1425 may select the base station beam 1450 based on a difference between the minimum time offset threshold and the offset between the scheduling slot and the sequentially first slot of the at least one slot.

In some examples, the beam selecting component 1425 may select the base station beam 1450 indicated by the TCI if the minimum time offset threshold is less than the offset between the scheduling slot and the sequentially first slot of the at least one slot of offset information 1455. In some examples, the beam selecting component 1425 may select a default beam if the minimum time offset threshold is greater than the offset between the scheduling slot and the sequentially first slot of the at least one slot of offset information 1455.

The semi-static slot configuration component 1430 may transmit a semi-static slot configuration 1470 to the slot scheduling component 1415 and to the UE, where a portion of the first slot aggregation conflicts with the semi-static slot configuration. In some examples, the semi-static slot configuration component 1430 may refrain from transmitting an instance of the transport block during the portion of the first slot aggregation that conflicts with the semi-static slot configuration. In some cases, the sequentially first slot of the at least one slot is a first slot of a second portion of the first slot aggregation that does not conflict with the semi-static slot configuration.

In some examples, the UE capability component 1410 may receive from a UE an indication of a UE capability, e.g., a UE capability indication 1435, associated with a beam change at the UE.

In some examples, the slot scheduling component 1415 may transmit, during a scheduling slot, a control signal 1440 including a TCI and a grant for a transport block over a first slot aggregation including a set of slots, where each slot of the first slot aggregation is offset from the scheduling slot according to a scheduling constraint based on the indicated UE capability indication 1435.

In some examples, the slot scheduling component 1415 may determine a minimum time offset threshold from the scheduling slot based on the UE capability information 1435. In some examples, the slot scheduling component 1415 may select the set of slots such that the first slot aggregation occurs after the minimum time offset threshold from the scheduling slot.

In some examples, the slot scheduling component 1415 may transmit a set of repetitions of the control signal 1440 over a second slot aggregation occurring prior to the first slot aggregation. In some cases, the scheduling slot includes a slot carrying a last repetition of the set of repetitions of the control signal 1440. In some cases, the scheduling slot includes a slot carrying a first repetition of the set of repetitions of the control signal 1440.

The slot aggregation component 1420 may receive base station beam information 1445, which may include some information of the control signal 1440 from beam selecting component 1425. The information from control signal 1440 may include the transmission configuration indicator (TCI) and the grant for a transport block over the first slot aggregation. In some examples, the slot aggregation component 1420 may transmit or receive the transport block over the slot aggregation using a base station beam 1450 based on the TCI.

Figure 15:
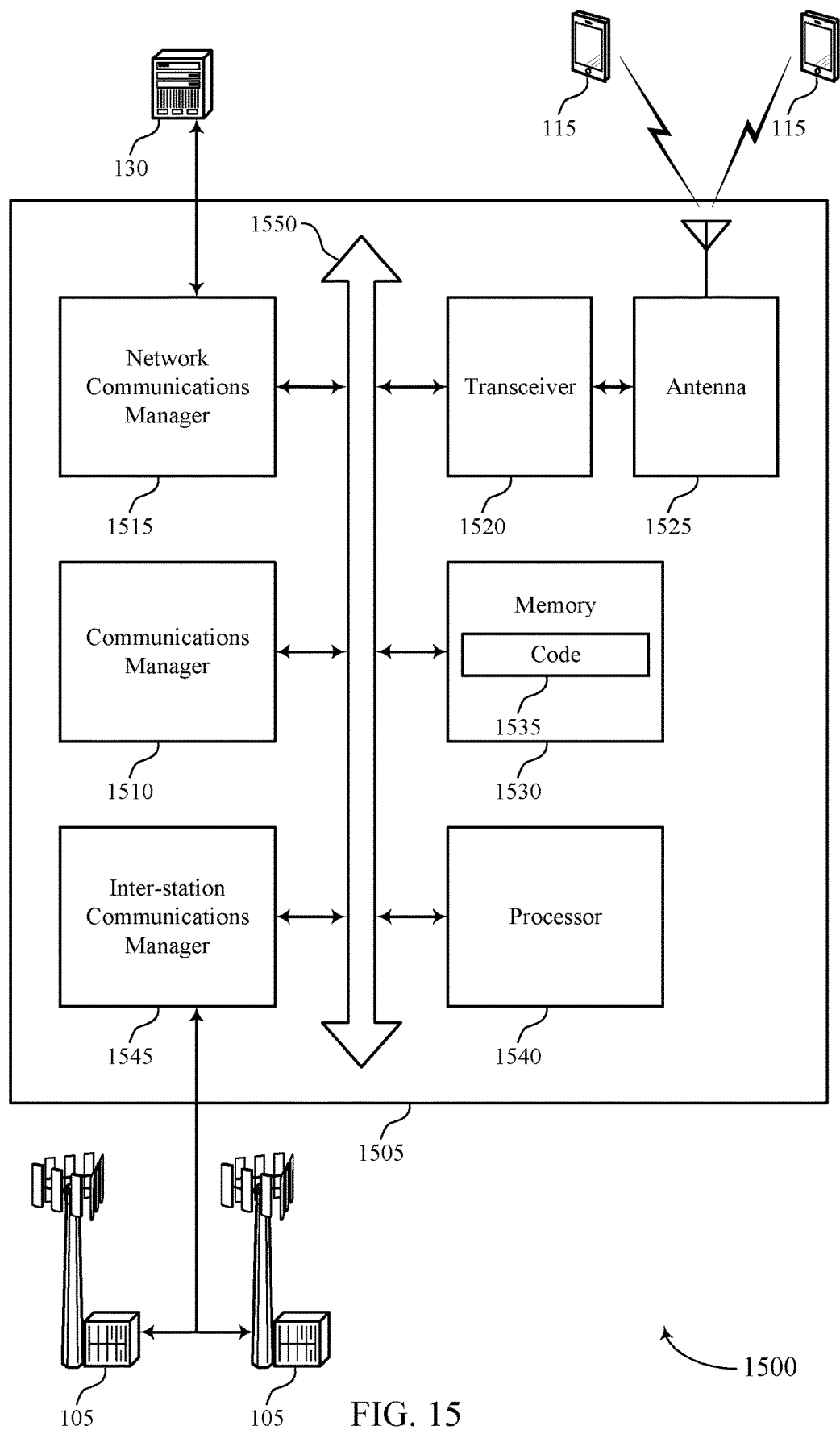
FIG. 15 shows a diagram of a system including a device that supports beam determination for a slot aggregation in accordance with aspects of the present disclosure.

FIG. 15 shows a diagram of a system 1500 including a device 1505 that supports beam determination for a slot aggregation in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may receive from a UE an indication of a UE capability associated with a beam change at the UE, transmit during a scheduling slot a control signal including a TCI and a grant for a transport block over a first slot aggregation including a set of slots, and transmit or receiving at least one instance of the transport block over at least one slot of the first slot aggregation using a base station beam, where the base station beam is selected based on the UE capability, an offset between the scheduling slot and a sequentially first slot of the at least one slot, and the TCI. The communications manager 1510 may also receive from a UE an indication of a UE capability associated with a beam change at the UE, transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability, and transmit or receiving the transport block over the slot aggregation using a base station beam based on the TCI.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1305 to perform various functions (e.g., functions or tasks supporting beam determination for a slot aggregation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
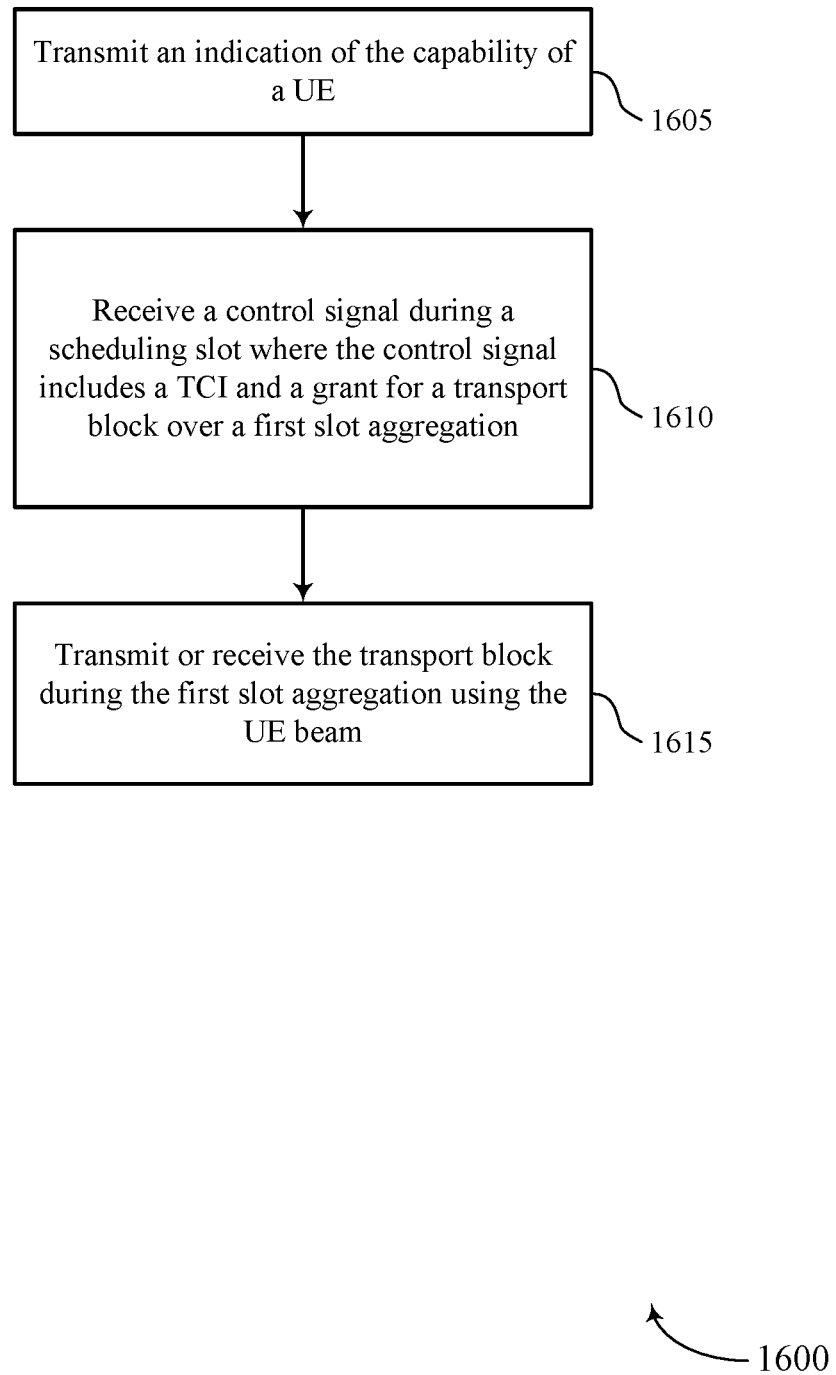
FIGS. 16 through 19 show flowcharts illustrating methods that support beam determination for a slot aggregation in accordance with aspects of the present disclosure.

FIG. 16 shows a flowchart illustrating a method 1600 that supports beam determination for a slot aggregation in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may transmit an indication of the capability of the UE. For example, the UE may transmit to a base station an indication of a UE capability associated with a beam change at the UE. In some examples, the UE capability may be based upon a change in a UE beam and may determine the type of beam and number of beams a UE may receive from a base station. The operations of 1605 may be performed according to the methods described herein. In some examples, aspects of the operations of 1605 may be performed by a UE capability component as described with reference to FIGS. 8 through 11.

At 1610, the UE may receive a control signal during a scheduling slot where the control signal includes a TCI and a grant for a transport block over a first slot aggregation. For example, the UE may receive from the base station during a scheduling slot a control signal including a TCI and a grant for a transport block over a first slot aggregation including a set of slots. In some examples, the TCI and grant of the control signal may be used to determine the scheduling of a subsequent transmission by the UE. The operations of 1610 may be performed according to the methods described herein. In some examples, aspects of the operations of 1610 may be performed by a slot scheduling component as described with reference to FIGS. 8 through 11.

At 1615, the UE may transmit or receive the transport block during the first slot aggregation using the UE beam. For example, the UE may transmit or receive at least one instance of the transport block over at least one slot of the first slot aggregation using a UE beam, where the UE beam is selected based on the UE capability, an offset between the scheduling slot and a sequentially first slot of the at least one slot, and the TCI. In some examples, the aggregated transport block transmission may be received by a base station which may schedule a subsequent transmission based upon the aggregated transport block. The operations of 1615 may be performed according to the methods described herein. In some examples, aspects of the operations of 1615 may be performed by a slot aggregation component as described with reference to FIGS. 8 through 11.

Figure 17:
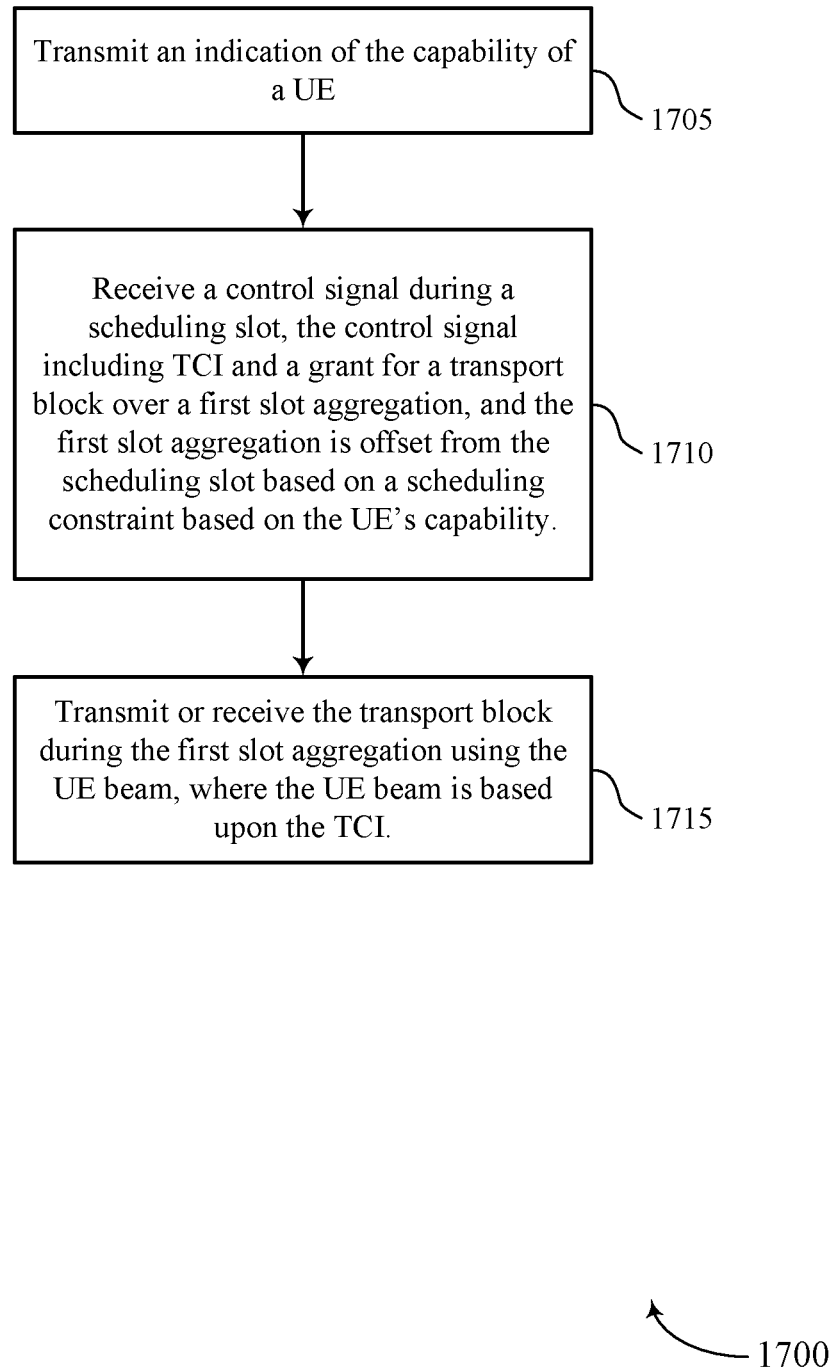

FIG. 17 shows a flowchart illustrating a method 1700 that supports beam determination for a slot aggregation in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1705 the UE may transmit an indication of the capability of the UE. For example, the UE may transmit to a base station an indication of a UE capability associated with a beam change at the UE. In some examples, the UE capability may be based upon a change in a UE beam and may determine the type of beam and number of beams a UE may receive from a base station. The operations of 1705 may be performed according to the methods described herein. In some examples, aspects of the operations of 1705 may be performed by a UE capability component as described with reference to FIGS. 8 through 11.

At 1710, the UE may receive a control signal during a scheduling slot, the control signal including TCI and a grant for a transport block over a first slot aggregation, and the first slot aggregation is offset from the scheduling slot based on a scheduling constraint based on the UE's capability. For example, the UE may receive from the base station during a scheduling slot a control signal including a TCI and a grant for a transport block over a first slot aggregation including a set of slots, where each slot of the first slot aggregation is offset from the scheduling slot according to a scheduling constraint based on the indicated UE capability. In some examples, the aggregated transport block transmission may be transmitted by a base station, which may schedule a subsequent transmission based upon the aggregated transport block's offset. The operations of 1710 may be performed according to the methods described herein. In some examples, aspects of the operations of 1710 may be performed by a slot scheduling component as described with reference to FIGS. 8 through 11.

At 1715, the UE may transmit or receive the transport block during the first slot aggregation using the UE beam, where the UE beam is based upon the TCI. For example, the UE may transmit or receiving the transport block over the first slot aggregation using a UE beam based on the transmission configuration indicator. In some examples, the aggregated transport block transmission may be received by a base station which may schedule a subsequent transmission based upon the aggregated transport block. The operations of 1715 may be performed according to the methods described herein. In some examples, aspects of the operations of 1715 may be performed by a slot aggregation component as described with reference to FIGS. 8 through 11.

Figure 18:
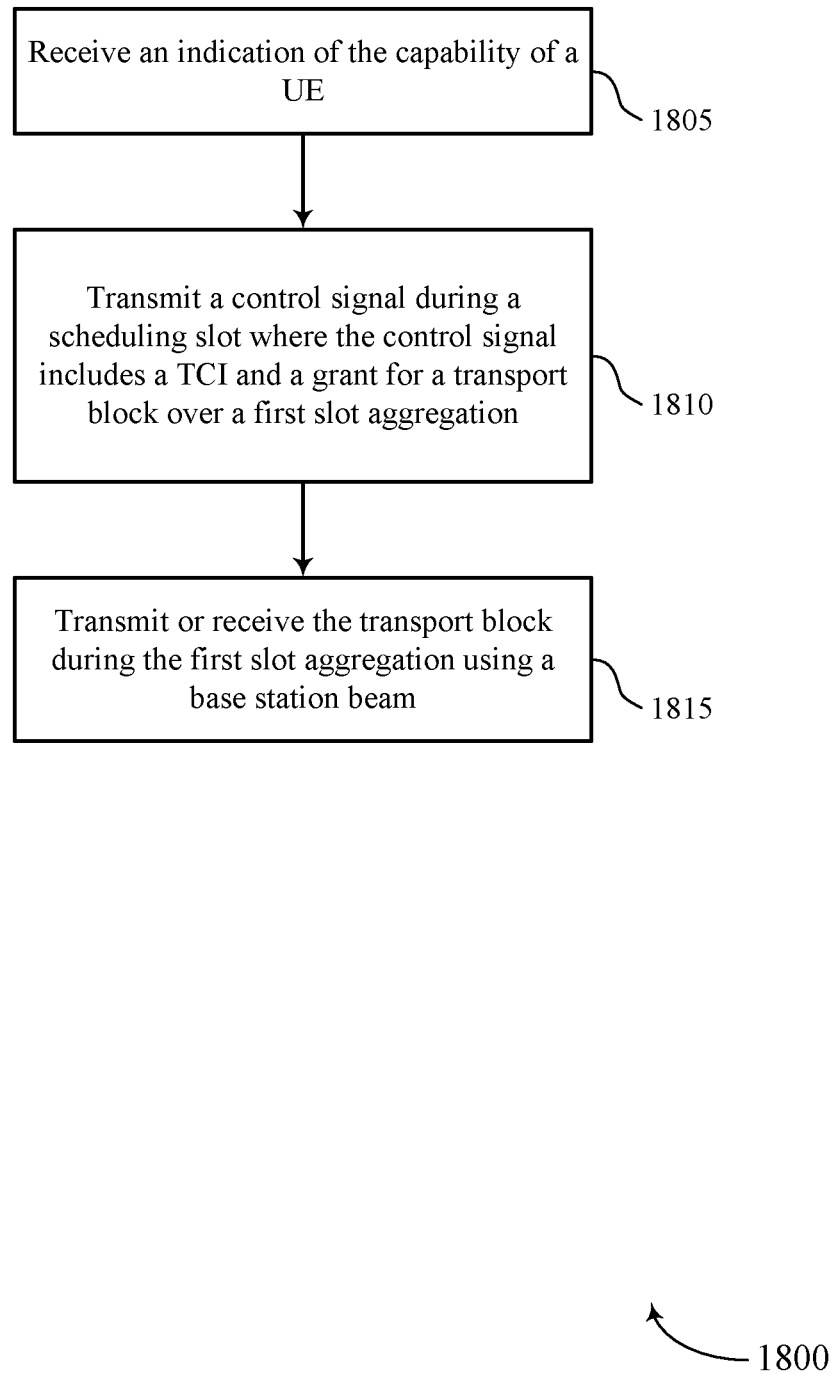

FIG. 18 shows a flowchart illustrating a method 1800 that supports beam determination for a slot aggregation in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1805, the base station may receive an indication of the capability of a UE. For example, the base station may receive from a UE an indication of a UE capability associated with a beam change at the UE. In some examples, the UE capability may be based upon a change in a UE beam and may determine the type of beam and number of beams a UE may receive from a base station. The operations of 1805 may be performed according to the methods described herein. In some examples, aspects of the operations of 1805 may be performed by a UE capability component as described with reference to FIGS. 12 through 15.

At 1810, the base station may transmit a control signal during a scheduling slot where the control signal includes a TCI and a grant for a transport block over a first slot aggregation. For example, the base station may transmit during a scheduling slot a control signal including a TCI and a grant for a transport block over a first slot aggregation including a set of slots. In some examples, the TCI and grant of the control signal may be used to determine the scheduling of a subsequent transmission by the UE. The operations of 1810 may be performed according to the methods described herein. In some examples, aspects of the operations of 1810 may be performed by a slot scheduling component as described with reference to FIGS. 12 through 15.

At 1815, the base station may transmit or receive the transport block during the first slot aggregation using the base station beam. For example, the base station may transmit or receiving at least one instance of the transport block over at least one slot of the first slot aggregation using a base station beam, where the base station beam is selected based on the UE capability, an offset between the scheduling slot and a sequentially first slot of the at least one slot, and the TCI. In some examples, the aggregated transport block transmission may be received by a UE which may schedule a subsequent transmission based upon the aggregated transport block. The operations of 1815 may be performed according to the methods described herein. In some examples, aspects of the operations of 1815 may be performed by a slot aggregation component as described with reference to FIGS. 12 through 15.

Figure 19:
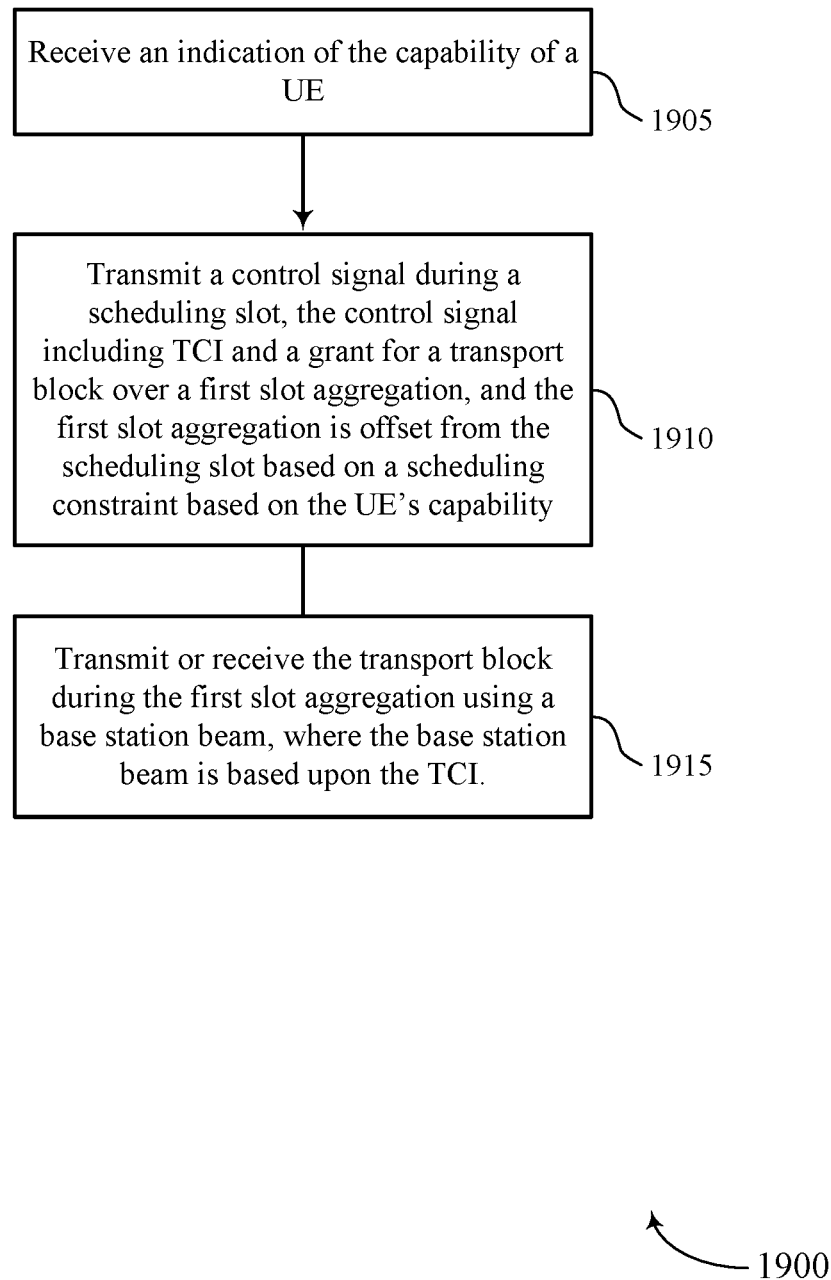

FIG. 19 shows a flowchart illustrating a method 1900 that supports beam determination for a slot aggregation in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally, or alternatively, a base station may perform aspects of the functions described below using special-purpose hardware.

At 1905 the base station may receive an indication of the capability of a UE. For example, the base station may receive from a UE an indication of a UE capability associated with a beam change at the UE. In some examples, the UE capability may be based upon a change in a UE beam and may determine the type of beam and number of beams a UE may receive from a base station. The operations of 1905 may be performed according to the methods described herein. In some examples, aspects of the operations of 1905 may be performed by a UE capability component as described with reference to FIGS. 12 through 15.

At 1910, the base station may transmit a control signal during a scheduling slot, the control signal including TCI and a grant for a transport block over a first slot aggregation, and the first slot aggregation is offset from the scheduling slot based on a scheduling constraint based on the UE's capability. For example, the base station may transmit, during a scheduling slot, a control signal including a TCI and a grant for a transport block over a first slot aggregation including a set of slots, where each slot of the first slot aggregation is offset from the scheduling slot according to a scheduling constraint based on the indicated UE capability. In some examples, the aggregated transport block transmission may be received by a UE which may schedule a subsequent transmission based upon the aggregated transport block's offset. The operations of 1910 may be performed according to the methods described herein. In some examples, aspects of the operations of 1910 may be performed by a slot scheduling component as described with reference to FIGS. 12 through 15.

At 1915, the base station may transmit or receive the transport block during the first slot aggregation using a base station beam, where the base station beam is based upon the TCI. For example, the base station may transmit or receiving the transport block over the slot aggregation using a base station beam based on the TCI. In some examples, the aggregated transport block transmission may be received by a UE which may schedule a subsequent transmission based upon the aggregated transport block. The operations of 1915 may be performed according to the methods described herein. In some examples, aspects of the operations of 1915 may be performed by a slot aggregation component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting to a base station an indication of a UE capability associated with a time threshold for a beam change at the UE;
   receiving from the base station a control signal comprising a transmission configuration indicator (TCI) and a grant for a transport block over a first slot aggregation comprising a plurality of slots, wherein receiving the control signal comprises receiving a plurality of repetitions of the control signal over a second slot aggregation occurring prior to the first slot aggregation, and wherein a scheduling slot for the control signal comprises a slot carrying a last repetition of the plurality of repetitions of the control signal;
   determining that an offset between the scheduling slot and a sequentially first slot of the first slot aggregation is smaller than the time threshold;
   refraining from performing a beam change for the plurality of slots of the first slot aggregation; and
   transmitting or receiving at least one instance of the transport block over at least one slot of the first slot aggregation using a UE beam, wherein the UE beam is selected based at least in part on the refraining.

2. The method of claim 1, wherein the time threshold is based at least in part on the indicated UE capability.

3. The method of claim 2, further comprising:
   receiving from the base station during a second scheduling slot a second control signal comprising a second transmission configuration indicator (TCI) and a second grant for a second transport block over the second slot aggregation comprising a second plurality of slots;
   determining that an offset between the second scheduling slot and a sequentially first slot of the second slot aggregation is larger than the time threshold; and
   performing the beam change based at least in part on the second TCI.

4. The method of claim 1, further comprising:
   receiving a semi-static slot configuration, wherein a portion of the first slot aggregation conflicts with the semi-static slot configuration.

5. The method of claim 4, further comprising:
   ignoring a portion of the first slot aggregation that conflicts with the semi-static slot configuration.

6. The method of claim 4, wherein a sequentially first slot of the first slot aggregation is a first slot of a second portion of the first slot aggregation that does not conflict with the semi-static slot configuration.

7. The method of claim 1, wherein the first slot aggregation includes a pair of slots.

8. The method of claim 7, wherein the UE is configured to transmit or receive on the pair of slots using a same MCS and a same resource element allocation.

9. The method of claim 1, wherein the first slot aggregation and second slot aggregation are part of a plurality of slot aggregations.

10. The method of claim 9, wherein each of the plurality of slot aggregations comprises a pair of slots, and each slot aggregation is adjacent to two other slot aggregations.

11. The method of claim 9, wherein the UE is configured to transmit or receive on the pair of slots using a same MCS and a same resource element allocation.

12. An apparatus for wireless communications at a user equipment (UE), comprising: a processor, memory in electronic communication with the processor; and instructions stored in the memory and executable by the processor to cause the apparatus to:
   transmit to a base station an indication of a UE capability associated with a time threshold for a beam change at the UE;
   receive from the base station a control signal comprising a transmission configuration indicator (TCI) and a grant for a transport block over a first slot aggregation comprising a plurality of slots, wherein receiving the control signal comprises receiving a plurality of repetitions of the control signal over a second slot aggregation occurring prior to the first slot aggregation, and wherein a scheduling slot for the control signal comprises a slot carrying a last repetition of the plurality of repetitions of the control signal;
   determine that an offset between the scheduling slot and a sequentially first slot of the first slot aggregation is smaller than the time threshold;
   refrain from performing a beam change for the plurality of slots of the first slot aggregation; and
   transmit or receive at least one instance of the transport block over at least one slot of the first slot aggregation using a UE beam, wherein the UE beam is selected based at least in part on the refraining.

13. The apparatus of claim 12, wherein the time threshold is based at least in part on the indicated UE capability.

14. The apparatus of claim 13, wherein the instructions are further executable by the processor to cause the apparatus to:
receive, from the base station, during a second scheduling slot a second control signal comprising a second transmission configuration indicator (TCI) and a second grant for a second transport block over the second slot aggregation comprising a second plurality of slots;
perform the beam change based at least in part on the second TCI if the time threshold is less than an offset between the second scheduling slot and a sequentially first slot of the second slot aggregation.

15. An apparatus for wireless communications at a user equipment (UE), comprising:
means for transmitting to a base station an indication of a UE capability associated with a time threshold for a beam change at the UE;
means for receiving from the base station a control signal comprising a transmission configuration indicator (TCI) and a grant for a transport block over a first slot aggregation comprising a plurality of slots, wherein the means for receiving the control signal comprises means for receiving a plurality of repetitions of the control signal over a second slot aggregation occurring prior to the first slot aggregation, and wherein a scheduling slot for the control signal comprises a slot carrying a last repetition of the plurality of repetitions of the control signal;
means for determining that an offset between the scheduling slot and a sequentially first slot of the first slot aggregation is smaller than the time threshold;
means for refraining from performing a beam change for the plurality of slots of the first slot aggregation; and
means for transmitting or receiving at least one instance of the transport block over at least one slot of the first slot aggregation using a UE beam, wherein the UE beam is selected based at least in part on the refraining.

16. The apparatus of claim 15, wherein the time threshold is based at least in part on the indicated UE capability.

17. The apparatus of claim 16, further comprising:
means for receiving from the base station during a second scheduling slot a second control signal comprising a second transmission configuration indicator (TCI) and a second grant for a second transport block over the second slot aggregation comprising a second plurality of slots;
means for determining that an offset between the second scheduling slot and a sequentially first slot of the second slot aggregation is larger than the time threshold; and
means for performing the beam change based at least in part on the second TCI.

18. A non-transitory computer-readable medium storing code for wireless communications at a user equipment (UE), the code comprising instructions executable by a processor to:
transmit to a base station an indication of a UE capability associated with a time threshold for a beam change at the UE;
receive from the base station a control signal comprising a transmission configuration indicator (TCI) and a grant for a transport block over a first slot aggregation comprising a plurality of slots, wherein receiving the control signal comprises receiving a plurality of repetitions of the control signal over a second slot aggregation occurring prior to the first slot aggregation, and wherein a scheduling slot for the control signal comprises a slot carrying a last repetition of the plurality of repetitions of the control signal;
determine that an offset between the scheduling slot and a sequentially first slot of the first slot aggregation is smaller than the time threshold;
refrain from performing a beam change for the plurality of slots of the first slot aggregation; and
transmit or receive at least one instance of the transport block over at least one slot of the first slot aggregation using a UE beam, wherein the UE beam is selected based at least in part on the refraining.

19. A method for wireless communications at a user equipment (UE), comprising:
receiving a semi-static slot configuration;
transmitting to a base station an indication of a UE capability associated with a time threshold for a beam change at the UE;
receiving from the base station a control signal comprising a transmission configuration indicator (TCI) and a grant for transmission of a transport block over a sequentially second slot in a first slot aggregation of a pair of slots, the first slot aggregation including a sequentially first slot and the sequentially second slot, wherein the sequentially second slot conflicts with the semi-static slot configuration, wherein receiving the control signal comprises receiving a plurality of repetitions of the control signal over a second slot aggregation occurring prior to the first slot aggregation, and wherein a scheduling slot for the control signal comprises a slot carrying a last repetition of the plurality of repetitions of the control signal;
determining that an offset between the scheduling slot and a sequentially first slot of the first slot aggregation is smaller than the time threshold;
refraining from performing a beam change for the plurality of slots of the first slot aggregation; and
transmitting or receiving at least one instance of the transport block over at least one slot of the first slot aggregation using a UE beam, wherein the UE beam is selected based at least in part on the refraining.

* * * * *